US010777081B2

(12) United States Patent
Nishimura et al.

(10) Patent No.: US 10,777,081 B2
(45) Date of Patent: Sep. 15, 2020

(54) COLLISION PREVENTING CONTROL DEVICE

(71) Applicant: TOYOTA JIDOSHA KABUSHIKI KAISHA, Toyota-shi, Aichi (JP)

(72) Inventors: Motoki Nishimura, Susono (JP); Kotaro Saiki, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 425 days.

(21) Appl. No.: 15/918,633

(22) Filed: Mar. 12, 2018

(65) Prior Publication Data

US 2018/0261094 A1 Sep. 13, 2018

(30) Foreign Application Priority Data

Mar. 13, 2017 (JP) .................................. 2017-047031

(51) Int. Cl.
*G08G 1/16* (2006.01)
*H04N 7/18* (2006.01)
*G06T 7/73* (2017.01)

(52) U.S. Cl.
CPC ................. *G08G 1/16* (2013.01); *G06T 7/73* (2017.01); *G06T 7/74* (2017.01); *G08G 1/166* (2013.01);
(Continued)

(58) Field of Classification Search
CPC .......... G08G 1/16; G08G 1/166; G08G 1/167; H04N 7/183; H04N 7/185; G06T 7/73; G06T 7/74; G06T 2207/10021; G06T 2207/30236; G06T 2207/30261; B60W 30/09; B60W 40/02; B60W 40/10; B60W 40/105; B60W 40/107; B60W 40/109;
(Continued)

(56) References Cited

U.S. PATENT DOCUMENTS 7,124,027 B1 * 10/2006 Ernst, Jr. ............... G01S 13/931
701/301
8,880,287 B2 * 11/2014 Lee ..................... B62D 5/0481
701/34.4
(Continued)

FOREIGN PATENT DOCUMENTS

JP 2014-067169 A 4/2014
JP 2015-166835 A 9/2015

*Primary Examiner* — Shardul D Patel
(74) *Attorney, Agent, or Firm* — Oliff PLC

(57) ABSTRACT

A collision preventing ECU 10 selects an obstacle point which has probability of colliding with an own vehicle, and calculates a collision time periods (TTC) of the obstacle point. When the minimum collision time period is equal to or shorter than a threshold time period, the collision preventing ECU 10 determines that a specific condition is established, and performs a collision preventing control to prevent the own vehicle from colliding with the an obstacle. When the obstacle which includes the obstacle point whose collision time period is minimum is a continuous structure, the collision preventing ECU 10 calculates a continuous structure angle, and memory a calculation number corresponding to an angle range within which a magnitude of the continuous structure angle falls. When there is no angle range whose calculation number is more than a threshold number, the collision preventing control is prohibited.

10 Claims, 19 Drawing Sheets

(52) U.S. Cl.
CPC ............ *G08G 1/167* (2013.01); *H04N 7/183* (2013.01); *H04N 7/185* (2013.01); *G06T 2207/10021* (2013.01); *G06T 2207/30236* (2013.01); *G06T 2207/30261* (2013.01)

(58) Field of Classification Search
CPC ........... B60W 40/112; B60W 50/0098; B60W 2710/18; B60W 2710/20; B60W 2520/14; B60W 2520/125; B60W 2520/105; B60W 2520/10; B60W 2554/00
USPC .................................................... 701/2, 301
See application file for complete search history.

(56) References Cited

U.S. PATENT DOCUMENTS

| | | | |
|---|---|---|---|
| 2018/0261094 A1* | 9/2018 | Nishimura | ............. H04N 7/185 |
| 2018/0339670 A1* | 11/2018 | Nishimura | ............. G08G 1/165 |
| 2019/0294893 A9* | 9/2019 | Berberian | .......... G06K 9/00805 |

* cited by examiner

COLLISION PREVENTING CONTROL DEVICE

BACKGROUND OF THE INVENTION

Field of the Invention

The present invention relates to a collision preventing control device which detects an obstacle which has probability of colliding with an own vehicle and performs a collision preventing control in order to prevent the own vehicle from colliding with the detected obstacle.

Description of the Related Art

Hitherto, for example, as proposed in Japanese Patent Application Laid-open No. 2014-67169, a collision preventing control device (hereinafter referred to as a "conventional device") divides a front end of the own vehicle into a plurality of parts in a width direction of the own vehicle so as to calculate a collision probability for each of the divided parts to collide with the obstacle every time a predetermined time elapses.

Subsequently, the conventional device calculates a total value of the probabilities of collision of each of the divided parts. The conventional device determines whether or not each of the total values of each of the divided parts is greater than a threshold. The conventional device performs a collision preventing control (for example, a control for braking a vehicle automatically, a control for changing a steering angle of a steering wheel automatically, or the like) when there is the part whose total value is greater than the threshold.

The part whose collision probability is maximum/highest among the parts that are predicted to collide with a "continuous structure (continuous structure object) which is a three-dimensional object continuously extending along a lane (for example, a crash barrier, a gully, edge stones, polls, or the like)" may remain unchanged while a driver is performing a steering operation so as to prevent the own vehicle from colliding with the continuous structure. Specifically, a right end or a left end of the own vehicle may often continue to be the part whose collision probability is maximum/highest.

Therefore, according to the conventional device, the total value of the collision probability of a certain part of the own vehicle may become greater than the threshold while the driver is performing a steering operation so as to prevent the own vehicle from colliding with the continuous structure. Thus, the collision preventing control may be performed if this happens. Such collision preventing control may annoy the driver, since the driver is performing the steering operation so as to prevent the own vehicle from colliding with the continuous structure.

SUMMARY OF THE INVENTION

The present invention has been made to solve the problem described above. The present invention has an object to provide a collision preventing control device that reduces a "possibility that the collision preventing control is performed while the driver is performing the steering operation so as to prevent the collision" when the obstacle which has probability of colliding with the own vehicle is the continuous structure, to thereby reduce a "possibility that the collision preventing control annoys the driver".

There is provided a collision preventing control device (hereinafter, referred to as a "present invention device") including:

an object information obtaining unit (11, 10, and Step 805) for obtaining object information including position information indicative of a position of each of feature points in relation to an own vehicle, the position being specified by a distance between each of the feature points and the own vehicle and a direction of each of the feature points in relation to the own vehicle;

an obstacle point selecting unit (10 and Step 820) for selecting one of the feature points that has probability of colliding with the own vehicle, as an obstacle point;

a collision time period calculating unit (10 and Step 830) for calculating a collision time period (time to collision: TTC) for which it takes for each of the obstacle points to collide with the own vehicle or for which it takes for each of the obstacle points to most closely approach the own vehicle, based on the relative velocity of each of the obstacle points in relation to the own vehicle and the distance between each of the obstacle points and the own vehicle;

a collision preventing control unit (10 and Step 860) for determining that a specific condition is established ("Yes" at Step 855) when a minimum collision time period among the calculated collision time periods is equal to or shorter than a threshold time period (T1th), and for starting to perform a collision preventing control to prevent the own vehicle from colliding with an obstacle including the obstacle point having the minimum collision time period when it is determined that the specific condition is established.

According to the present invention device, when the minimum collision time period is equal to or shorter than the threshold time period, the collision preventing control unit performs the collision preventing control against the obstacle including the obstacle point having the minimum collision time period. However, when the obstacle including the obstacle point having the minimum collision time period is the continuous structure, and when the driver is performing some steering operation, it is preferable that the collision preventing control be not performed.

In view of the above, the present invention device further includes:

a continuous structure determining unit (10 and Step 835) configured to:

select, as one of pairs of continuous points, one of pairs of the feature points that satisfies a predetermined continuous point condition among the feature points located in a side of a traveling direction of the own vehicle from the obstacle point having the minimum collision time period, based on the object information (Step 915);

determine, as a continuous structure, an obstacle including the continuous points as components (Step 950), when a total of a distance between each of the selected pairs of the continuous points is longer than a first threshold distance ("Yes" at Step 920); and select, as one of pairs of continuous points which are the components included in the continuous structure, one of pairs of the feature points that satisfies the continuous point condition among the feature points located in a side of a direction opposite to the traveling direction of the own vehicle from the obstacle point having the minimum collision time period (Step 965);

an angle calculating unit for calculating (10 and Step 1210), based on positions of the continuous points included in the continuous structure in relation to the own vehicle, an approximate line of the continuous structure (Step 1205)

when the obstacle is determined to be the continuous structure ("Yes" at Step 840), and for calculating, as a continuous structure angle (θcp), an angle of the continuous structure in relation to the own vehicle based on the calculated approximate line;

an updating unit (10 and Step 845) for updating a calculation number corresponding to an angle range within which a magnitude of the calculated continuous structure angle falls among a plurality of angle ranges (Step 1220), each having a predetermined angle, when the continuous structure angle is calculated; and a control unit (10) for prohibiting the collision preventing control unit from performing the collision preventing control when there is no angle range whose calculation number is larger than the threshold number ("No" at Step 850), or for changing the minimum collision time period or the threshold time period (Step 1910) such that the specific condition becomes more difficult to be established when there is no angle range whose calculation number is larger than the threshold number than when there is any angle range whose calculation number is larger than the threshold number.

When the driver is performing the steering operation against the continuous structure, the continuous structure angle which is an angle of the continuous structure in relation to the own vehicle tends to vary/change. On the other hand, when the driver is not performing the steering operation against the continuous structure, the continuous structure angle does not vary/change so as to be an approximately constant value. Thus, according to the present invention device, there is no angle range whose calculation number is larger than the threshold number, when the driver is performing the steering operation against the continuous structure. Therefore, when the driver is performing the steering operation against the continuous structure, the present invention device prohibits itself from performing the collision preventing control, or changes the minimum collision time period or the threshold time period such that the specific condition becomes more difficult to be established. Accordingly, when the driver is performing the steering operation against the continuous structure, possibility of performing the collision preventing control can be reduced. Therefore, possibility that the collision preventing control annoys the driver can be reduced.

In one of aspects of the present invention, the control unit is configured to:

set the threshold time period to a predetermined first threshold time period (Step 1905 in FIG. 19) when there is any angle range whose calculation number is larger than the threshold number ("Yes" at Step 850 in FIG. 19); and set the threshold time period to a predetermined second threshold time period that is shorter than the first threshold time period such that the specific condition becomes more difficult to be established (Step 1910 in FIG. 19), when there is no angle range whose calculation number is larger than the threshold number ("No" at Step 850 in FIG. 19).

According to the above aspect, when the driver is performing the steering operation against the continuous structure, the possibility of performing the collision preventing control can be reduced certainly.

In one of aspects of the present invention, the control unit is configured to change, when there is no angle range whose calculation number is larger than the threshold number ("No" at Step 850 in FIG. 19), the minimum collision time period such that the minimum collision time period becomes larger so that the specific condition becomes more difficult to be established than when there is any angle range whose calculation number is larger than the threshold number.

According to the above aspect, when the driver is performing the steering operation against the continuous structure, the possibility of performing the collision preventing control can be reduced certainly.

In one of aspects of the present invention, the angle calculating unit is configured to calculate the approximate line and the continuous structure angle, every time a predetermined time period elapses (Step 1205 and Step 1210), and the updating unit is configured to initialize each of the calculation number corresponding to each of the angle ranges other than the angle range within which the magnitude of the continuous structure angle calculated at a first time point when the approximate line is newly calculated falls (Step 1225), and to set the calculation number corresponding to the angle range within which the magnitude of the continuous structure angle calculated at the first time point falls to "1" (Step 1230), when a direction of the approximate line newly calculated at the first time point in relation to a longitudinal direction of the own vehicle is different from a direction of the approximate line calculated at a second time point which is the predetermined time period before the first time point in relation to the direction of the longitudinal direction of the own vehicle ("No" at Step 1215).

When the direction of the approximate line in relation to the longitudinal direction of the own vehicle at the first time point is different from the direction of the approximate line in relation to the longitudinal direction of the own vehicle at the second time point, the continuous structure at the first time point is located in one of sides of a right side and a left side in relation to the own vehicle, and the continuous structure at the second time period is located in the other side of the right side and the left side in relation to the own vehicle. Thus, it is determined that the continuous structure selected at the first time point is an object different from the continuous structure selected at the second time point. When the continuous structure selected at the first time point is the object different from the continuous structure selected at the second time point, the present invention device initializes all of the calculation numbers, each corresponding to each of the angle ranges other than the angle range within which the magnitude of the continuous structure angle calculated at the first time point falls, and to set the calculation number corresponding to the angle range within which the magnitude of the continuous structure angle calculated at the first time point falls to "1". Therefore, the calculation number of the angle range is counted correctly for the same continuous structure. Thereby, accuracy in determining whether the driver is performing the steering operation against the continuous structure can be improved.

In one of aspects of the present invention,
the continuous structure determining unit is configured to:
select the obstacle point having the minimum collision time period as a base point (Step 905); and
execute a traveling direction selecting process (Step 915) for:
selecting, as a processing point, the feature point which is closest to the base point in the side of the traveling direction of the own vehicle (Step 1005);
determining that a pair of the base point and the processing point satisfies the continuous point condition when a difference between a distance from the base point to the own vehicle and a distance from the processing point to the own vehicle falls within a predetermined range ("Yes" at Step 1025), and a distance (L) from the base point to the processing point is shorter than a second threshold distance (L2th) ("Yes" at Step 1035); and selecting the base point and the processing point as the pair of the continuous points (Step 1050) when it is determined that the pair of the base point and the processing point satisfies the continuous point condition;

execute, when the total of the distance between each of the pairs of the continuous points is equal to or shorter than the first threshold distance ("Yes" at Step 920), the traveling direction selecting process again (Step 915) after selecting, as a new base point, the processing point that has been selected as the continuous point (Step 925);

determine the obstacle as the continuous structure (Step 950) and select the obstacle point having the minimum collision time period as the base point (Step 960), when the total of the distance between each of the pairs of the continuous points is longer than the first threshold distance ("Yes" at Step 920); and execute, after selecting the base point, an opposite direction selecting process (Step 965) for:

selecting, as the processing point, the feature point that is closest to the base point in the side of the direction opposite to the traveling direction of the own vehicle (Step 1105); and selecting the base point and the processing point as the pair of the continuous points (Step 1115), when a pair of the base point and the processing point satisfies the continuous point condition ("Yes" at Step 1025 in FIG. 11 and "Yes" at Step 1035 in FIG. 11).

In this manner, when the "difference between the distance from the base point to the own vehicle and the distance from the processing point to the own vehicle" falls within the predetermined range, and when the distance from the base point to the processing point is shorter than a second threshold distance, the base point and the processing point are selected as the continuous points. Therefore, the continuous points can be selected accurately.

In one of aspects of the present invention, the continuous structure determining unit is configured to:

in executing the traveling direction selecting process, select, as a new processing point, the feature point which is closest to the base point among the feature points in the side of the traveling direction of the own vehicle except the feature point which has been selected as the processing point (Step 1060), when the pair of the base point and the processing point does not satisfy the continuous point condition ("No" at Step 1025 or "No" at Step 1045), and determine whether or not a pair of the base point and the new processing point satisfies the continuous point condition; and determine that the obstacle including the obstacle point having the minimum collision time period is not the continuous structure (Step 955) when there is no pair of the base point and the processing point that satisfies the continuous point condition by a time point when the new processing point is selected a predetermined number of times or more ("Yes" at Step 1055).

Accordingly, in executing the traveling direction selecting process, when there is no pair of the base point and the processing point that satisfies the continuous point condition by a time point when the new processing point is selected a predetermined number of times or more (i.e., in a case where the selecting number reaches the predetermined number), it is determined that the obstacle including the obstacle having the minimum collision time period is not the continuous structure. Thereby, a processing load of the present invention device can be reduced.

In one of aspects of the present invention, the continuous structure determining unit is configured to:

in executing the opposite direction selecting process, select, as a new processing point, the feature point which is closest to the base point among the feature points in the side of the direction opposite to the traveling direction of the own vehicle except the feature point which has been selected as the processing point (Step 1125), when the pair of the base point and the processing point does not satisfy the continuous point condition ("No" at Step 1025 in FIG. 11 or "No" at Step 1045 in FIG. 11), and determine whether or not a pair of the base point and the new processing point satisfies the continuous point condition; and recognize, as the components of the continuous structure, the at least one pair of the continuous points which has been selected when there is no pair of the base point and the processing point that satisfies the continuous point condition by a time point when the new processing point is selected a predetermined number of times or more ("Yes" at Step 1120).

In this manner, in executing the opposite direction selecting process, when there is no pair of the base point and the processing point that satisfies the continuous point condition by a time point when the new processing point is selected a predetermined number of times or more (i.e., in a case where the selecting number reaches the predetermined number), the at least one of the continuous points which is selected until this time point is recognized as the components of the continuous structure. Thereby, the processing load of the present invention device can be reduced.

In one of aspects of the present invention, the continuous structure determining unit is configured to:

in executing at least one of the traveling direction selecting process and the opposite direction selecting process, calculate a continuous points approximate line (AL') through the continuous points which have been selected, the base point and the processing point, based on locations of the continuous points which has been selected in relation to the own vehicle, a location of the base point in relation to the own vehicle, and a location of the processing point in relation to the own vehicle (Step 1405), when the distance from the base point to the processing point is longer than or equal to the second threshold distance ("No" at Step 1035 in FIG. 10 and FIG. 11);

calculate, as a continuous points angle (θc), an angle of the calculated continuous points approximate line in relation to the own vehicle (Step 1410);

refer to interpolation distance information (60) which defines a relationship among velocity of the own vehicle, the continuous points angle, and an interpolation distance between an intersection point (LIP) at which a left side of the own vehicle intersects with a virtual line (VL) having the continuous points angle and an intersection point (RIP) at which a right side of the own vehicle intersects with the virtual line (VL) under an assumption that the own vehicle is turning at the velocity and at a predetermined emergency preventing yaw rate (Yr), so as to calculate the interpolation distance corresponding to a present velocity of the own vehicle and the calculated continuous points angle (Step 1415); and select the base point and the processing point as the pair of the continuous points when the distance from the base point to the processing point is equal to or shorter than the interpolation distance and the difference between the distance from the base point to the own vehicle and the distance from the processing point to the own vehicle falls within the predetermined range.

Even if there is an area where the component of the continuous structure is not detected as the feature point, when the distance between two feature points which sandwich the area is equal to or shorter than the interpolation distance, the area is recognized as the component of the continuous structure. As a result, accuracy in determining whether or not the obstacle is the continuous structure can be improved. In general, the feature point in a column unit of a crash barrier tends to be detected easily, whereas, the feature point in a beam unit of the crash barrier tends not to be detected easily. Accordingly, in a case where the crash barrier is recognized as the continuous structure, the aspect above of the present invention device is particularly effective.

Further, even if the distance between the base point and the processing point is longer than the second threshold distance, when the distance between the base point and the processing point is equal to or shorter than the interpolation distance, the driver does not steer the own vehicle SV to pass through the area between the base point and the processing point, since the own vehicle SV cannot pass through that area. Accordingly, there is no problem with the aspect recognizing that the area between the base point and the processing point is the component of the continuous structure.

In one of aspects of the present invention,
the object information obtaining unit is configured to:
photograph a surround area around the own vehicle using two camera sensors; and
calculate the distance between each of the feature points and the own vehicle and the directions of each of the feature points in relation to the own vehicle, using a parallax between the feature point of the object in one camera image photographed by one camera sensor and that feature point of that object in another camera image photographed by another camera sensor.

The object information includes a continuous structure probability that the feature point becomes to be the component of the continuous structure, the continuous structure probability being calculated based on the camera images for a predetermined area including that feature point.

The continuous structure determining unit is configured to:
determine whether or not the continuous points include the feature point whose continuous structure probability is equal to or smaller than a predetermined threshold probability (Step 930) when the total of the distance between each of the pairs of the continuous points is longer than or equal to the first threshold distance ("Yes" at Step 920);
calculate a continuous points approximate line (AL') of the continuous points which have been selected based on locations of the continuous points which have been selected in relation to the own vehicle (Step 1405), when the continuous points include the feature point whose continuous structure probability is equal to or smaller than the threshold probability ("Yes" at Step 930);
calculate an angle of the calculated continuous points approximate line in relation to the own vehicle, as a continuous points angle ($\theta c$) (Step 1410);
refer to interpolation distance information (60) which defines a relationship among velocity (V) of the own vehicle, the continuous points angle ($\theta c$), and an interpolation distance (Lc) which is a distance between an intersection point (LIP) at which a left side of the own vehicle intersects with a virtual line (VL) having the continuous points angle and an intersection point (RIP) at which a right side of the own vehicle intersects with the virtual line (VL) under an assumption that the own vehicle is turning at the velocity and at a predetermined emergency preventing yaw rate (Yr), so as to calculate the interpolation distance corresponding to a present velocity of the own vehicle and the calculated continuous points angle (Step 1415); and recognize, as the component of the continuous structure, the feature point whose continuous structure probability is equal to or smaller than the threshold probability, when a distance between confidence points is equal to or shorter than the interpolation distance, the distance between confidence points representing a distance between a first continuous point which is closest to the feature point whose the continuous structure probability is equal to or smaller than the threshold probability in the traveling direction of the own vehicle and whose the continuous structure probability is larger than the threshold probability and a second continuous point which is closest to the feature point whose the continuous structure probability is equal to or smaller than the threshold probability in the opposite direction of the own vehicle and whose the continuous structure probability is larger than the threshold probability ("Yes" at Step 945), so as to determine that the obstacle including the obstacle point having the minimum collision time period is the continuous structure (Step 950).

Even if the continuous structure probability of the feature point which should be recognized as the component of the continuous structure is calculated so as to be equal to or smaller than the threshold probability, when a distance between confidence points of this feature point is equal to or shorter than the interpolation distance, this feature point is recognized as the component of the continuous structure. As a result, accuracy in determining whether or not the obstacle is the continuous structure can be improved. Even if the feature point whose continuous structure probability is calculated so as to be equal to or smaller than the threshold probability is not the component of the continuous structure, when the distance between confidence points is equal to or shorter than the interpolation distance, the own vehicle cannot pass an area having the distance between the confidence points. Therefore, the driver does not steer the own vehicle SV to pass through the area. Accordingly, there is no problem with the aspect determining that the area is the component of the continuous structure.

One of aspects of the present invention device further comprises;
a vehicle status information obtaining unit (13, 10, and Step 810) for obtaining vehicle status information including a yaw rate and velocity of the own vehicle;
a traveling lane predicting unit (10 and Step 815) for predicting, based on the vehicle status information, a traveling lane (RCR) of a center point (point O) in a width direction of the own vehicle, and
wherein the obstacle point selecting unit is configured to select one of the feature points that has probability of colliding with the own vehicle as the obstacle point, based on a relative traveling direction of the feature points in relation to the own vehicle and the traveling lane (Step 820).

In this manner, the feature point which has probability of colliding with the own vehicle is selected as the obstacle accurately.

In the above description, in order to facilitate the understanding of the invention, reference symbols used in embodiment of the present invention are enclosed in parentheses and are assigned to each of the constituent features of the invention corresponding to the embodiment. However, each of the constituent features of the invention is not limited to the embodiment as defined by the reference symbols.

DESCRIPTION OF THE PREFERRED EMBODIMENTS

A collision preventing control device according to each embodiment of the present invention will next be described with reference to the accompanying drawings.

First Embodiment

Figure 1:
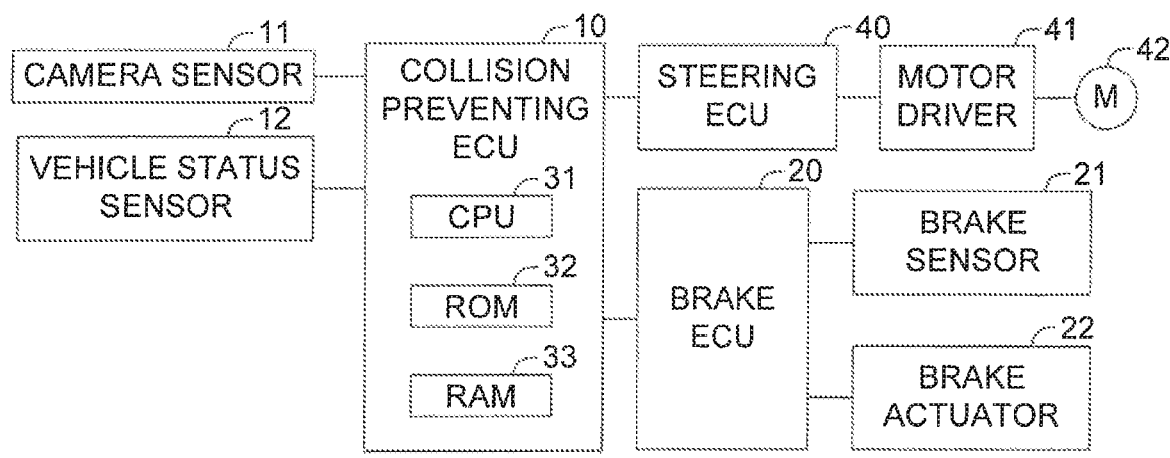
FIG. 1 is a schematic system configuration diagram of a collision preventing device (first device) according to a first embodiment of the present invention.

FIG. 1 is a schematic system configuration diagram of a collision preventing control device (hereinafter referred to as a "first device") according to a first embodiment of the present invention. A vehicle in which the collision preventing control device is installed is referred to as an "own vehicle", when this vehicle needs to be distinguished from other vehicles. The first device performs a collision preventing control in order to prevent the own vehicle from colliding with an obstacle which has high possibility/probability of colliding with the own vehicle, so as to support a driver's driving operation.

The first device includes a collision preventing ECU 10. It should be noted that an ECU is an abbreviation of an "Electric Control Unit" which includes a microcomputer as a main part. The microcomputer of the ECU 10 includes a CPU 31, and memories (for example, a ROM 31, a RAM 32, and the like). The CPU 31 achieves various functions by executing instructions (program, routine) stored in the ROM 32.

The first device further includes a camera sensor 11, a vehicle status sensor 12, a brake ECU 20, a brake sensor 21, a brake actuator 22, a steering ECU 40, a motor driver 41, and a steering motor 42. The camera sensor 11, the vehicle status sensor 12, the brake ECU 20, and the steering ECU 40 are connected to the collision preventing ECU 10.

The camera sensor 11 includes a vehicle-mounted stereo camera device (not shown) which photographs an area ahead of the own vehicle, and an image processing device (not shown) which processes images photographed by the vehicle-mounted stereo camera device.

The vehicle-mounted stereo camera device is arranged near a center of a front end of the own vehicle's roof in a width direction. The vehicle-mounted stereo camera device includes a left camera arranged in a left side of a vehicle longitudinal axis and a right camera arranged in a right side of the vehicle longitudinal axis. The left camera photographs the area ahead of the own vehicle, and transmits a left image signal representing a left image photographed by the left camera to the image processing unit, every time a predetermined time period elapses. Similarly, the right camera photographs the area ahead of the own vehicle, and transmits a right image signal representing a right image photographed by the right camera to the image processing unit, every time the predetermined time period elapses.

The image processing unit detects/extracts a feature point (s) from the left image represented by the received left image signal, and detects/extracts a feature point(s) from the right image represented by the received right image signal. The feature point is extracted/detected using a well-known method such as Harris, Features from Accelerated Segment-Test (FAST), Speeded Up Robust Features (SURF), Scale-Invariant Feature Transform (SIFT), or the like.

Thereafter, the image processing unit selects one of the feature points extracted from the left image, and specifies one of the feature points extracted from the right image which corresponds to the feature point selected from the left image. The image processing unit calculates a distance between the selected feature point and the own vehicle, and a direction of the selected feature point in relation to the own vehicle, using a parallax between those feature points.

Subsequently, the image processing device calculates a "continuous structure probability of the selected feature point" which indicates/represents a probability/likelihood that the extracted feature point is included in (or corresponds to) a continuous structure. The continuous structure probability is binary, namely either "0" or "1". Specifically, the image processing device calculates a feature amount of an image of an area which has a predetermined size and includes the selected feature point. The method for calculating the feature amount of the image of the area which has the predetermined size is well-known (for example, refer to Japanese Patent Application Laid-open No. 2015-166835). The image processing device calculates that the continuous structure probability of the feature point is "0" when a magnitude of a difference between the calculated feature amount and a continuous structure feature amount stored in the image processing device is equal to or smaller than a threshold amount. On the other hand, the image processing device calculates that the continuous structure probability of the feature point is "1" when the magnitude of the difference between the calculated feature amount and the continuous structure feature amount is larger than the threshold amount. The feature point whose continuous structure probability is "1" is more likely to be a component/element included in the continuous structure than the feature point whose continuous structure probability is "0". The continuous structure amount is a feature amount calculated in advance based on a continuous structure's image which is prepared in advance. The continuous structure amount is stored in the image processing device. When the continuous structure is a crash barrier (guardrail), a continuous structure amount of a support column part of the barrier and a continuous structure amount of a beam part of the barrier are stored in the image processing device.

Furthermore, the image processing device transmits, to the collision preventing ECU 10, object information including location information of the feature point and the continuous structure probability of the feature point, every time a predetermined time period elapses. The location information includes a distance between the feature point and the own vehicle, and a direction of the feature point in relation to the own vehicle.

The collision preventing ECU 10 specifies change in a position (moving transition) of the feature point which is included in the object information transmitted from the image processing device. The collision preventing ECU 10 recognizes a relative velocity of the feature point in relation to the own vehicle and a relative moving trajectory/path of the feature point in relation to the own vehicle, based on the specified change in the position (moving transition) of the feature point.

The vehicle status sensor 12 is a sensor which obtains vehicle status information on a traveling status of the own vehicle, which is required to predict a predicted traveling path RCR of the own vehicle. The vehicle status sensor 12 includes a vehicle velocity sensor which obtains velocity (speed) of the own vehicle, an acceleration sensor which obtains an acceleration in a longitudinal direction of the own vehicle's horizontal plane and an acceleration in a width direction of the own vehicle's horizontal plane, a yaw rate sensor which obtains a yaw rate of the own vehicle, a steering angle sensor which obtains a steering angle of a steering wheel. The vehicle status sensor 12 transmits the vehicle status information to the collision preventing ECU 10 every time a predetermined time period elapses.

The collision preventing ECU 10 calculates a turning radius of the own vehicle based on the velocity of the own vehicle obtained by the vehicle velocity sensor, and the yaw rate obtained by the yaw rate sensor. Then, the collision preventing ECU 10 predicts, as the predicted traveling path (course, trajectory) RCR, a traveling path (course, trajectory) along which the center point in the width direction of the own vehicle (the center point on a wheel axis connecting a left wheel and a right wheel) will move. When a magnitude of the yaw rate is larger than "0", a shape of the predicted traveling path RCR is an arc. When the magnitude of the yaw rate is "0", the collision preventing ECU 10 predicts a straight traveling path along a direction of the acceleration obtained by the acceleration sensor as the traveling path along which the own vehicle will move (i.e. the predicted traveling path RCR). The collision preventing ECU 10 recognizes (determines), as the predicted traveling path RCR, a part of the traveling path having a finite distance from a present location of the own vehicle to a location where the own vehicle will move for a predetermined distance/length from the present location along the traveling path, regardless of whether the own vehicle is running straight or turning.

The brake ECU 20 is connected to a plurality of brake sensors 21. The brake ECU 20 receives detection signals transmitted from these brake sensors. The brake sensors 21 obtain parameters which the brake ECU 20 uses when the brake ECU 20 controls a brake device (not shown) mounted on the own vehicle. The brake sensors include a brake pedal operating amount sensor which detects a brake pedal operating amount, a wheel velocity sensor which detects a rotation speed of the wheel, and etc.

The brake ECU 20 is connected to a brake actuator 21. The brake actuator 21 is a hydraulic control actuator. The brake actuator 21 is provided in an unillustrated hydraulic circuit between an unillustrated master cylinder which pressurizes working oil by using a depressing force applied to the brake pedal and unillustrated friction brake mechanisms provided in front left, front right, rear left, and rear right wheels. The brake ECU 20 drives the brake actuator 22 so as to have the wheels generate frictional braking forces to thereby adjust the acceleration (a negative acceleration, i.e. a deceleration) of the own vehicle.

The brake ECU 20 and the collision preventing ECU 10 are connected to each other through a CAN (controller area network) so that the brake ECU 20 and the collision preventing ECU 10 can send and receive information to and from one another. Accordingly, the brake ECU 20 drives the brake actuator 22 based on a signal transmitted from the collision preventing ECU 10 so as to adjust the acceleration of the own vehicle.

The steering ECU 40 is a controller of a well known electric power steering system and is connected to a motor driver 41. The motor driver 41 is connected to a steering motor 42. The steering motor 42 is installed in an unillustrated "steering mechanism of the vehicle which includes a steering wheel, a steering shaft connected to the steering wheel, a steering gear mechanism, or the like". The steering motor 42 generates torque by using electric power supplied from the motor driver 41. This torque is used for generating steering assist torque and for turning the left and right steered wheels of the own vehicle.

<Outline of Operation>

An operation of the first device will next be described. The first device selects, as an obstacle point(s), at least one of feature points which is predicted to have probability of colliding with the own vehicle SV among the feature points included in the object information. The feature points selected as the obstacle point may include a feature point which is predicted to have probability of not colliding with the own vehicle SV but to have probability of excessively approaching the own vehicle SV (or to have a narrow margin of clearance between the feature point and the own vehicle SV). Thereafter, the first device calculates a time to collision TTC (collision time period) for each of the obstacle points to collide with the own vehicle SV or to reach the closest point to the own vehicle.

Further, the first device determines whether or not an obstacle including (specified by) the obstacle point whose time to collision TTC is minimum is a continuous structure which has a predetermined distance or longer along a lane (in which the own vehicle SV is traveling). The first device calculates a continuous structure angle which is an angle of the continuous structure in relation to the own vehicle SV (or an angle formed between the continuous structure and a longitudinal axis direction of the own vehicle SV), when the first device determines that the obstacle is the continuous structure. Furthermore, the first device specifies, among a plurality of predetermined angle ranges, an angle range within which a magnitude of the calculated continuous structure angle falls (or an angle range to which the calculated continuous structure angle belongs). The first device increments a calculation number (a counter) CN corresponding to the specified angle range by "1" (refer to angle storing information 50 described later).

The first device determines whether or not the minimum time to collision TTC is equal to or shorter than a threshold time period Tth when at least one of the following two conditions is established.

a condition that the obstacle including the obstacle point having the minimum time to collision TTC is not the continuous structure a condition that the obstacle including the obstacle point having the minimum time to collision TTC is the continuous structure and there is any angle range which has the calculation number CN larger than a threshold number CN1th When it is determined that the minimum time to collision TTC is equal to or shorter than the threshold time period Tth, the first device performs a collision preventing control so as to prevent the own vehicle SV from colliding with the obstacle including the obstacle point having the minimum time to collision TTC.

The first device prohibits itself from performing (or does not perform) the collision preventing control when the obstacle including the obstacle point having the minimum time to collision TTC is the continuous structure and there is no angle range having the calculation number CN larger than the threshold number CN1th.

<Detail of Operation>

A detail of the operation of the first device will next be described. Firstly, a process for selecting/extracting the obstacle point is described referring to FIG. 2. The first device selects, as an obstacle point(s), at least one of feature points which is predicted to have probability of colliding with the own vehicle SV among the feature points included in the object information. The feature points selected as the obstacle point may include a feature point which is predicted not to collide with the own vehicle SV but to have a narrow margin of clearance between the feature point and the own vehicle SV (or to extremely approach the own vehicle SV). As described above, the first device predicts, as the predicted traveling path RCR, a traveling course/path along which the center point (referring to a point PO) on a wheel axis connecting the left wheel and the right wheel will move. The first device predicts, based on a "part of the predicted traveling path RCR" having a finite distance, an predicted left traveling path LEC along which a point PL will move, and an predicted right traveling path REC along which a point PR will move. The point PL is a point positioned leftward by a predetermined distance αL from a left end of a body of the own vehicle SV. The point PR is a point positioned rightward by a predetermined distance αR from a right end of the body of the own vehicle SV. That is, the predicted left traveling path LEC is a path obtained by a parallel shift of the predicted traveling path RCR in the left direction of the own vehicle SV by a "distance obtaining by adding a half (W/2) of a vehicle-body width W to the predetermined distance αL". The predicted right traveling path REC is a path obtained by a parallel shift of the predicted traveling path RCR in the right direction of the own vehicle SV by a "distance obtaining by adding a half (W/2) of the vehicle-body width W to the predetermined distance αR". Each of the distance αL and the distance αR is a distance which is longer than or equal to "0". The distance αL and the distance αR may be the same as each other, or may be different from each other. The first device specifies, as an predicted traveling path area ECA (referring to FIG. 3), an area between the predicted left traveling path LEC and the predicted right traveling path REC.

Further, the first device calculates/predicts a moving trajectory/path of the feature point based on the past locations/positions of the feature point. The first device calculates/predicts a moving direction of the feature point in relation to the own vehicle SV, based on the calculated moving trajectory/path of the feature point. Subsequently, the first device selects/extracts, as the obstacle point(s) which has probability (high possibility) of collision with the own vehicle SV, one or more of the feature points which has been in the predicted traveling path area ECA (refer to FIG. 3) and which will intersect with a front end area TA of the own vehicle SV, and one or more of the feature points which will be in the predicted traveling path area ECA and which will intersect with the front end area TA of the own vehicle SV, based on the predicted traveling path area ECA (refer to FIG. 3), the relative relation (the relative location and the relative velocity) between the own vehicle SV and the feature point, and the moving direction of the feature point in relation to the own vehicle SV. The front end area TA is an area represented by a line segment between the point PL and the point PR.

The first device predicts, as the predicted left traveling path LEC, the "trajectory/path along which the point PL will move", and predicts, as the predicted right traveling path REC, the "trajectory/path along which the point PR will move". Thus, the "feature point which has been in the predicted traveling path area ECA and will intersect with the front end area TA of the own vehicle SV" may include a feature point which is likely to pass near the left side or the right side of the own vehicle SV, and the "feature point which will be in the predicted traveling path area ECA and will intersect with the front end area TA of the own vehicle SV" may include the feature point which is likely to pass near the left side or the right side of the own vehicle SV. Accordingly, the first device can select/extract, as the obstacle point, the feature point which has probability of passing near the left side or the right side of the own vehicle SV.

Figure 2:
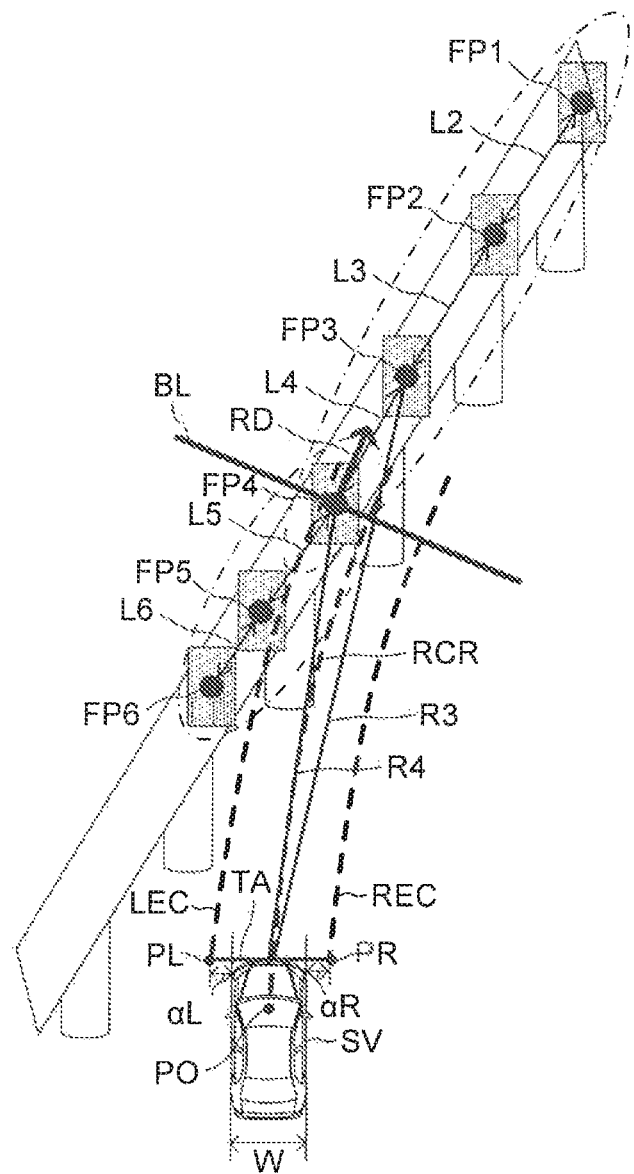
FIG. 2 is a diagram illustrating an outline of a continuous structure determining process for determining whether an obstacle is a continuous structure.

In the example shown in FIG. 2, the feature points FP1 through FP6 have been detected, and the feature point FP4 has been selected/extracted as the obstacle point. Hereinafter, the feature point FP4 selected as the obstacle point may be referred to as an "obstacle point FP4".

A process of calculating the time to collision TTC of the obstacle point will next be described.

After the first device selects the obstacle point, the first device obtains the time to collision TTC of the obstacle point by dividing the distance (the relative distance) between the own vehicle SV and the obstacle point by the relative velocity of the obstacle point in relation to the own vehicle SV.

The time to collision TTC is either a time T1 or a time T2, described below.

The time T1 is a time (period) which it takes for the obstacle point to collide with the own vehicle SV (a time from the present time point to an predicted collision time point).

The time T2 is a time which it takes for the obstacle point which has probability of passing near either side of the own vehicle SV to reach the closest point to the own vehicle SV (a time period from the present time point to the time point at which the own vehicle most closely approaches the obstacle point).

The time to collision TTC is a time which it takes for the obstacle point to reach the "front end area TA of the own vehicle SV" under an assumption that the obstacle point and the own vehicle SV move while keeping the relative velocity and the relative moving direction at the present time period.

Furthermore, the time to collision TTC represents a time period which it takes for the first device to be able to perform the collision preventing control to prevent the own vehicle from colliding with the "obstacle including the obstacle point" or a time period which it takes for the driver to be able to perform a collision preventing operation (driver's operation to prevent the collision). The time to collision TTC is a parameter representing an urgency degree, and corresponds to a necessity degree for the collision preventing control. In other words, as the time to collision TTC is shorter, the necessity degree for the collision preventing control is greater/higher, and, as the time to collision TTC is longer, the necessity degree for the collision preventing control is smaller/lower.

Now, an outline of a continuous structure determining process is described.

After the first device calculates the time to collision TTC for each of the obstacle points, it performs the continuous structure determining process for determining whether or not the "object (obstacle) including the obstacle point whose time to collision TTC is minimum (the obstacle point which is likely to collide with the own vehicle SV or is likely to reach the closest point to the own vehicle SV earliest)" is the continuous structure. The continuous structure is the object which continuously extends to have a predetermined distance or longer along the lane (in which the own vehicle is traveling).

In the example shown in FIG. 2, only the feature point FP4 is selected as the obstacle point. Thus, the obstacle point whose time to collision TTC is minimum is the feature point FP4. Therefore, the first device selects/designates the feature point FP4 as a base point. Then, the first device sets/specifies, as a forward direction, a traveling direction RD (an upper right direction on a paper plane of FIG. 2) of the predicted traveling path RCR at the feature point FP4. More specifically, the first device has the predicted traveling path RCR parallel shift (translates the path RCR) so that the parallel shifted predicted traveling path RCR passes through the feature point FP4, and calculates/determines, as the traveling direction RD, a direction of the tangent of the parallel shifted predicted traveling path RCR at the feature point FP4.

Subsequently, the first device selects/designates, as a processing point, a feature point which is closest to the base point FP4 among the feature points and which is located in a side of the traveling direction RD with respect to a base line BL which is a perpendicular line of the traveling direction RD at the base point FP4. Thereafter, the first device determines whether or not the base point FP4 and the processing point satisfy both of the following continuous point conditions (A) and (B). When the base point FP4 and the processing point satisfy both of the continuous point conditions (A) and (B), the first device selects/determines the base point FP4 and the processing point as continuous points.

(A) A value obtained by subtracting a "distance/length between the processing point and the own vehicle SV" from a "distance/length between the base point and the own vehicle SV" is within a predetermined range.

(B) A point-to-point distance/length L representing a distance/length between the base point and the processing point is equal to or shorter than a threshold distance L1th.

In the example shown in FIG. 2, the feature point FP3 is selected as the processing point. A value (R4−R3) obtained by subtracting the "distance/length (R3) between the processing point FP3 and the own vehicle SV" from the "distance/length (R4) between the base point FP4 and the own vehicle SV" is within the predetermined range. Thus, the base point FP4 and the processing point FP3 satisfy the above continuous point condition (A). Further, the distance/length (L4) between the base point FP4 and the processing point FP3 is equal to or shorter than the threshold distance L1th. Thus, the base point FP4 and the processing point FP3 satisfy the above continuous point condition (B). Accordingly, the first device selects/determines the feature points FP4 and FP3 as the continuous points.

When the base point and the processing point do not satisfy at least one of the continuous point conditions (A) and (B), the first device selects, as a new processing point, the feature point which is the closest to the base point among the feature points in the side of the traveling direction RD except/excluding the feature point which has been selected as the processing point. Then, the first device determines whether or not the base point and the new processing point satisfy both of the continuous point conditions (A) and (B). When the base point and the processing point that satisfy both of the continuous point conditions (A) and (B) are not found when the the first device selects new processing point a predetermined number of times, the first device determines that the obstacle including the obstacle point whose time to collision TTC is minimum is not the continuous structure.

After the first device selects the continuous points in the forward direction, the first device determines whether or not a total of the distance between the continuous points in the forward direction is larger/longer than a predetermined continuous structure determining distance (hereinafter, referred to as a "first threshold distance"). When the total of the distance between the continuous points in the forward direction is larger/longer than the continuous structure determining distance, the first device determines that the obstacle including the obstacle point whose time to collision TTC is minimum is the continuous structure. The first device recognizes, as an end point of the continuous structure in the forward direction, the processing point which has been selected as the continuous point at the last time.

When the total of the distance between the continuous points in the forward direction is equal to or shorter/smaller than the continuous structure determining distance, the first device selects, as a new base point, the processing point which has been selected as the continuous point at the last time, and continues to select the continuous point in the forward direction. When the feature point FP3 is selected as the continuous point, the total (L4) of the distance between the continuous points is equal to or shorter/smaller than the continuous structure determining distance (first threshold distance). Therefore, the first device selects the feature point FP3 as the new base point, and selects the continuous point in the forward direction. In this case, the feature point FP2 is selected as the continuous point. The total (L4+L3) of the distance between the continuous points is equal to or shorter/smaller than the continuous structure determining distance. Thus, the first device selects the feature point FP2 as the new base point, and selects the continuous point. In this case, the feature point FP1 is selected as the continuous point. The total (L4+L3+L2) of the distance between the continuous points is larger/longer than the continuous structure determining distance. Thus, the feature point FP1 is recognized as the end point of the continuous structure in the forward direction.

When the total of the distance between the continuous points in the forward direction is larger/longer than the continuous structure determining distance, the first device selects the closest feature point to the base point FP4 among the feature points in a direction (a bottom left direction on the paper plane of FIG. 2) opposite to the forward direction from the base point FP4, and selects the continuous points in that direction (opposite direction). Thus, the feature point FP5 is selected as the continuous point.

When the total of the distance between the continuous points in the opposite direction is larger/longer than the continuous structure determining distance, the first device recognizes, as an end point of the continuous structure in the opposite direction, the processing point which has been selected as the continuous point at the last time. Thereafter, the first device selects, as the continuous structure, a set of the feature points including the obstacle point FP4, the continuous points in the forward direction, and the continuous points in the opposite direction.

When the total of the distance between the continuous points in the opposite direction is equal to or shorter than the continuous structure determining distance, the first device selects, as a new base point, the processing point which has been selected as the continuous point at the last time, and continues to select the continuous point in the opposite direction. When the feature point FP5 is selected as the continuous point, the total (L5) of the distance between the continuous points in the opposite direction is equal to or shorter than the continuous structure determining distance. Therefore, the first device selects the feature point FP5 as the new base point, and selects the continuous point in the opposite direction. As a result, the feature point FP is selected as the continuous point. The total (L5+L6) of the distance between the continuous points in the opposite direction is equal to or shorter than the continuous structure determining distance. The first device selects the feature point FP6 as the new base point. The feature point in the opposite direction from the feature point FP6 is not found. Therefore, the first device recognizes, as the components of the continuous structure, the continuous points FP5 and FP6 in the opposite direction which has been selected at the present time. The feature point FP6 is recognized as the end point of the continuous structure in the opposite direction.

By means of the above processes, the first device selects the set (group) including the continuous points FP1 through FP6 as the continuous structure, and determines that the obstacle including the obstacle point FP4 is the continuous structure.

Next, the first device performs an updating process for calculating a continuous structure angle θcp (refer to θcp1 through θcp3 in FIG. 3) which is an angle of the continuous structure with respect to the own vehicle SV, and for incrementing one of calculation numbers by "1". The incremented calculation number corresponds to an angle range within which the continuous structure angle θcp falls. The calculation numbers are stored as angle storing information 50 (refer to FIG. 4). Hereinafter, this updating process will be described using FIG. 3 through FIG. 7.

Figure 3:
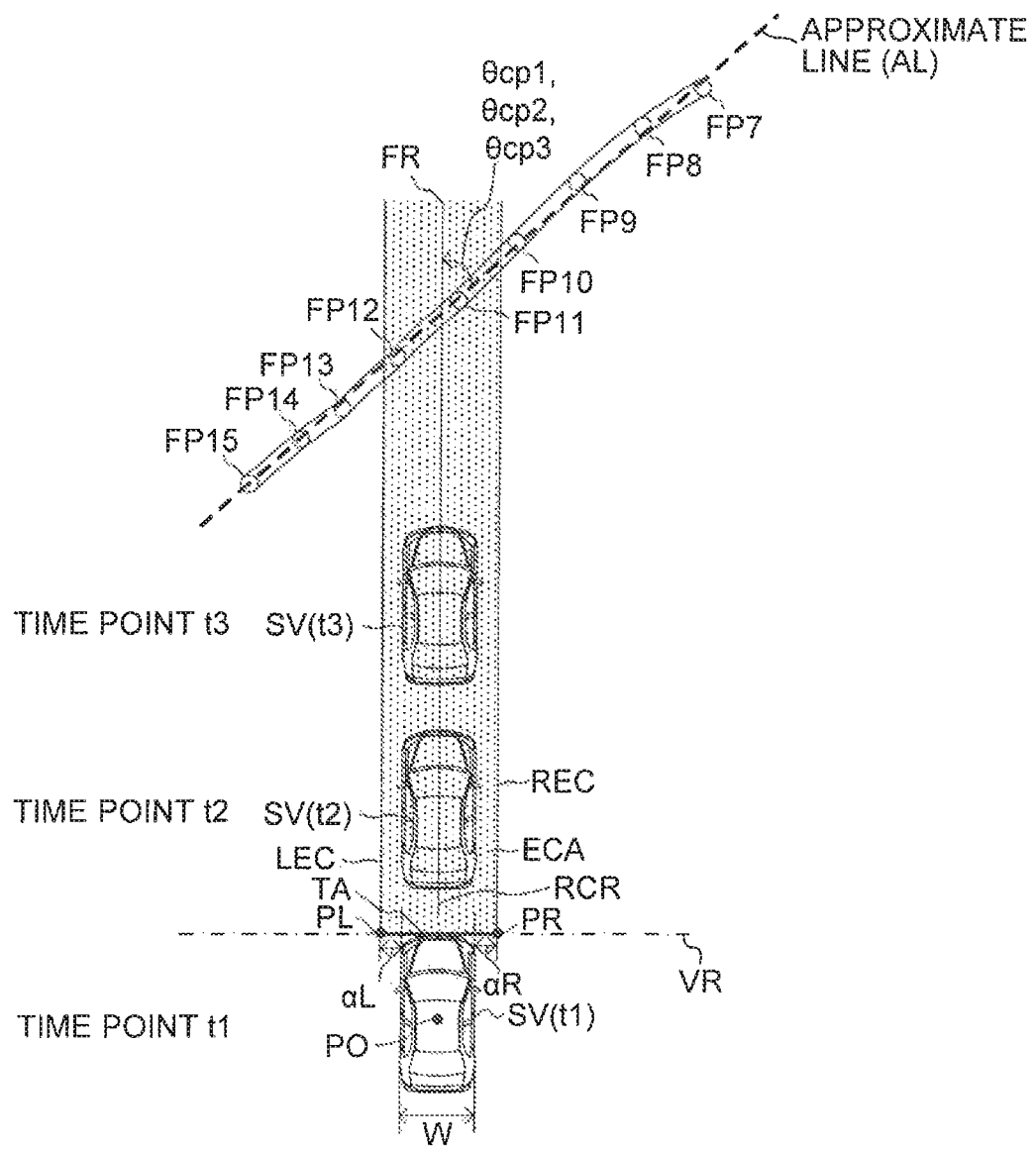
FIG. 3 is a diagram illustrating an outline of a process for calculating a continuous structure angle when an own vehicle is running straight ahead.

It is now assumed that the feature points FP7 through FP15 illustrated in FIG. 3 have been detected, and the feature points FP11 and FP12 have been selected as the obstacle points, at a time point t1 shown in FIG. 3. Further, it is assumed that the time to collision TTC of the obstacle point FP12 is shorter/smaller than the time to collision TTC of the obstacle point FP13, and thus, the time to collision TTC of the obstacle point FP12 is minimum (shortest). In this case, the first device selects the obstacle point FP12 as the base point, and selects the continuous points in the forward direction. As a result, the feature points FP11 through FP7 are sequentially selected as the continuous points in this order. When the feature point FP7 is selected as the continuous point, the total of the distance between the continuous points is longer than the continuous structure determining distance. Therefore, the first device determines that the obstacle including the obstacle point FP12 is the continuous structure. In this case, the feature point FP7 is the end point of the continuous structure in the forward direction. Further, the first device selects the continuous points in the opposite direction using the obstacle point FP12 as the base point. As a result, the feature points FP13 through FP15 are sequentially selected as the continuous points in this order. When the feature point FP15 is selected as the continuous point, no feature point is selected as the continuous point in the opposite direction from the feature point FP15. Thus, the feature point FP15 is the end point of the continuous structure in the opposite direction.

Accordingly, the set (group) including the continuous points FP7 through FP15 is selected as the continuous structure at the time point t1.

Next, the first device calculates an approximate line AL of the continuous structure based on locations of the selected continuous points with respect to the own vehicle SV, and calculates the continuous structure angle θcp representing the angle of the continuous structure in relation to the own vehicle SV based on the calculated approximate line AL.

More specifically, the first device calculates the approximate line AL of all of the continuous points which has been selected as the components of the continuous structure, based on the direction of each of those continuous points with respect to the own vehicle SV and the distance between each of those continuous points and the own vehicle SV, those continuous points being included in the object information obtained from the camera sensor 11 at the time point t1. The first device uses a least-square method to calculate the approximate line AL. Subsequently, the first device calculates, as the continuous structure angle θcp1 at the time point t1, the angle of the approximate line AL with respect to the longitudinal axis direction FR of the own vehicle SV.

The continuous structure angle θcp is either of a positive value or a negative value. In detail, the continuous structure angle θcp is the positive value when a direction from the approximate line AL to the longitudinal axis direction FR of the own vehicle SV at an "intersection point where the approximate line AL intersects with the longitudinal axis direction FR" is a counterclockwise direction, and the continuous structure angle θcp is the negative value when a direction from the approximate line AL to the longitudinal axis direction FR at the intersection point is a clockwise direction. As illustrated in FIG. 3, the direction from the approximate line AL to the longitudinal axis direction FR is the counterclockwise direction. Therefore, the continuous structure angle θcp1 at the time point t1 is the positive value.

Subsequently, the first device updates the angle storing information 50 by incrementing the calculation number corresponding to the angle range/field within which a magnitude of the calculated continuous structure angle θcp falls by "1". Hereinafter, the angle storing information 50 will be described using FIG. 4.

The angle storing information 50 stores each of the calculation numbers CN corresponding to each of the angle ranges in the RAM 33. Each of the angle ranges has a predetermined width (10 deg) in an angle field between 0 deg and 180 deg (the angle field between 0 deg and 180 deg is divided into the angle ranges by 10 deg) so that the continuous structure angle θcp falls within one of the angle ranges. The angle storing information 50 holds a relationship between the angle ranges and the respective calculation numbers CN.

If the magnitude of the continuous structure angle θcp1 at the time point t1 in FIG. 3 falls within the angle range between 40 deg and 50 deg, the first device add "1" to a value of the calculation number CN corresponding to that angle range between 40 deg and 50 deg in the angle storing information 50. As a result, the calculation number CN corresponding to the angle range between 40 deg and 50 deg becomes "1". At this point in time, the calculation number CN corresponding to the angle range except the angle range between 40 deg and 50 deg is "0".

Subsequently, the first device determines whether or not there is any angle range whose calculation number CN is larger than a threshold number CN1th ("2" in this example) in the angle storing information 50. There is no angle range whose calculation number CN is larger than the threshold number CN1th at the time point t1. In this case, the first device prohibits itself from performing the collision preventing control. As a result, even if the time to collision TTC of the obstacle point FP12 is equal to or shorter than the threshold time period T1th at the time point t1, the collision preventing control is not performed.

At a time point t2 when a predetermined time elapses from the time period t1, the first device reads/obtains the object information from the camera sensor 11. When there is any feature point which is the obstacle point, the first device calculates the time to collision TTC of that feature/obstacle point. Thereafter, the first device determines whether or not the obstacle including the obstacle point whose time to collision TTC is minimum is the continuous structure. It is assumed that the own vehicle SV continues to run straight ahead from the time point t1 to the time point t2, and the own vehicle SV is still running straight ahead at the time point t2 in the example shown in FIG. 3. Thus, at the time point 2, similarly to the time point t1, the feature point FP 12 is the obstacle point whose time to collision TTC is minimum, and the set (group) of the feature points including the continuous points FP 7 through FP 15 is selected as the continuous structure.

The continuous points selected as the components of the continuous structure at the time point t2 are the same as those selected at the time point t1. As described above, the own vehicle SV continues to run straight ahead from the time point t1 to the time point t2, and thus, the direction of the own vehicle SV at the time point t2 is the same as that at the time point t1 so that the direction of the longitude axis direction FR of the own vehicle SV at the time point t2 is the same as that at the time point t1. Therefore, the continuous structure angle θcp2 at the time point t2 is the same as the continuous structure angle θcp1 at the time point t1. Accordingly, the first device increments the calculation number CN corresponding to the angle range between 40 deg and 50 deg by "1". As a result, the calculation number CN corresponding to the angle range between 40 deg and 50 deg becomes "2", but there is no angle range whose calculation number CN is larger than the threshold number N1th ("2") in the angle storing information 50. Accordingly, the first device prohibits itself from performing (does not perform) the collision preventing control at the time point t2.

At a time point t3 when the predetermined time elapses from the time period t2, the first device reads/obtains the object information from the camera sensor 11. When there is any feature point which is the obstacle point, the first device calculates the time to collision TTC of that feature/obstacle point. Thereafter, the first device determines whether or not the obstacle including the obstacle point whose time to collision TTC is minimum is the continuous structure. It is assumed that the own vehicle SV continues to run straight ahead from the time point t2 to the time point t3, and the own vehicle SV is still running straight ahead at the time point t3. Thus, at the time point 3, similarly to the time point t1 and the time point t2, the feature point FP 12 is the obstacle point whose time to collision TTC is minimum, and the set of the feature points including the continuous points FP 7 through FP 15 is selected as the continuous structure. Therefore, the continuous structure angle θcp3 at the time point t3 is the same as the continuous structure angle θcp1 at the time point t1 and the continuous structure angle θcp2 at the time point t2.

Figure 4:
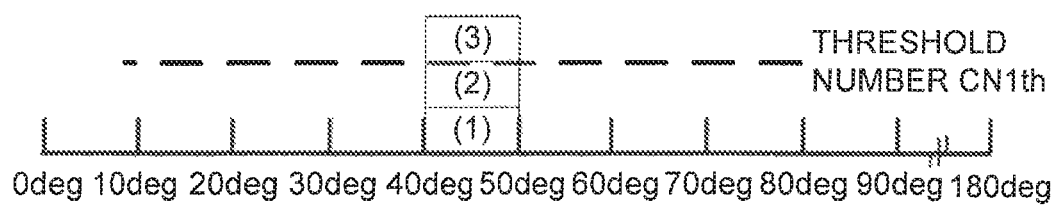
FIG. 4 is a diagram illustrating angle storing information where the continuous structure angle illustrated in FIG. 3 is stored.

When the first device calculates the continuous structure angle θcp3 at the time point t3, the first device increments the calculation number CN corresponding to the angle range between 40 deg and 50 deg by "1". As a result, the calculation number CN corresponding to the angle range between 40 deg and 50 deg becomes "3", and thus, there is the angle range between 40 deg and 50 deg whose calculation number CN is larger than the threshold number N1th ("2") in the angle storing information 50, as illustrated in FIG. 4. In this case, even if the obstacle is the continuous structure, the first device allows the collision preventing control to be performed. Specifically, in this case, the first device determines whether or not the minimum time to collision TTC is equal to or shorter than the threshold time period Tth. If it is assumed that the minimum time to collision TTC at the time point t2 is equal to or shorter than the threshold time period Tth in the example shown in FIG. 3, the minimum time to collision TTC at the time point t3 is inevitably equal to or shorter than the threshold time period Tth. Accordingly, the first device performs the collision preventing control at the time point t3.

In the example shown in FIG. 3, the first device performs the collision preventing control since a "condition that there is the angle range whose calculation number CN is larger than the threshold number CN1th" is established. Next, referring to FIG. 5 through FIG. 7, an example is described where the above condition is never established, so that the first device continues prohibiting itself from performing the collision preventing control.

Figure 5:
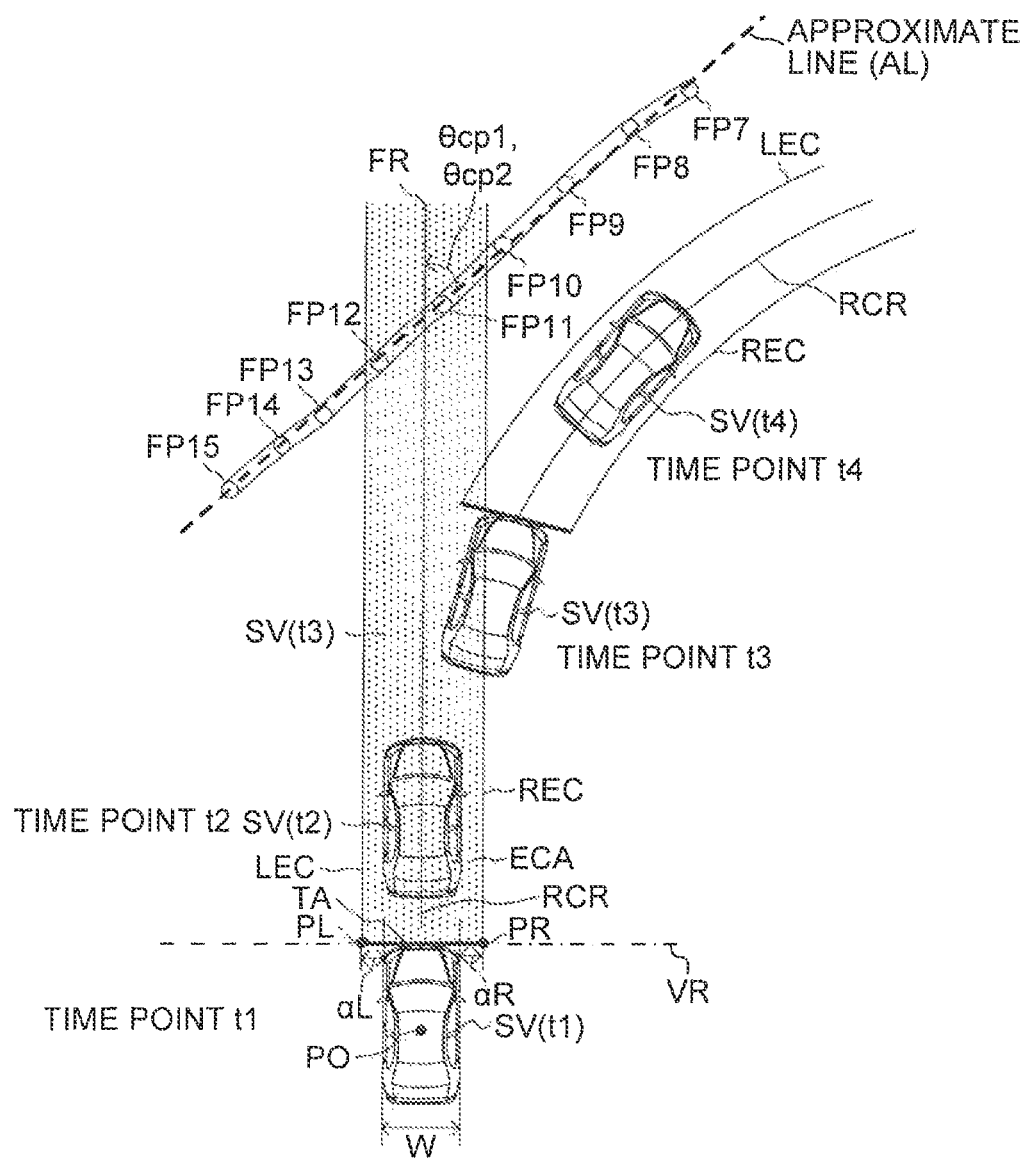
FIG. 5 is a diagram illustrating an outline of a process for calculating the continuous structure angle when a steering operation to prevent the own vehicle from colliding the continuous structure is being performed.

In the example shown in FIG. 5, the trajectory/path of the own vehicle SV is illustrated when the driver performs a steering operation in order to prevent the own vehicle SV from colliding with the continuous structure.

At time points t1 and t2 (i.e., up to the time point t2), situations are the same as those in the example illustrated in FIG. 3. As described above, up to the time point t2, the maximum calculation number CN (the calculation number CN corresponding to the angle range between 40 deg and 50 deg) being "2" among the calculation numbers CN stored in the angle storing information 50 is equal to or smaller than the threshold number CN1th, and the calculation numbers CN corresponding to the other angle ranges are "0". Therefore, there is no angle range whose calculation number CN is larger than the threshold number CN1th in the angle storing information 50 at the time point t2. Thus, at the time point t2, the collision preventing control is prohibited so that the collision preventing control is not performed even if the minimum time to collision TTC is equal to or shorter than the threshold time period Tth.

It is assumed that the driver starts to perform the above steering operation from the time point t2 to the time point t3. As illustrated in FIG. 5, the predicted traveling path RCR of the own vehicle SV at the time point t3 becomes a trajectory/path to prevent the own vehicle SV from colliding with the continuous structure. Consequently, at the time point t3, there is no feature point which is predicted to intersect the front end area TA of the own vehicle SV. In other words, there is no obstacle which has probability of colliding with the own vehicle SV. Therefore, at the time point t3, the collision preventing control is not performed. At time point t4, similarly to the time point t3, the collision preventing control is not performed since there is no obstacle.

In this manner, although the minimum time to collision TTC at the time point t2 is equal to or shorter than the threshold time period Tth, the first device does not perform the collision preventing control, because there is no angle range whose calculation number CN is larger than the threshold number CN1th in the angle storing information 50. When the driver is going to perform the steering operation to prevent the own vehicle SV from colliding with the continuous structure between the time point t2 and the time point t3, the collision preventing control is prohibited at the time point t2. Accordingly, the possibility that the driver is annoyed by the collision preventing control can be reduced.

Figure 6A:
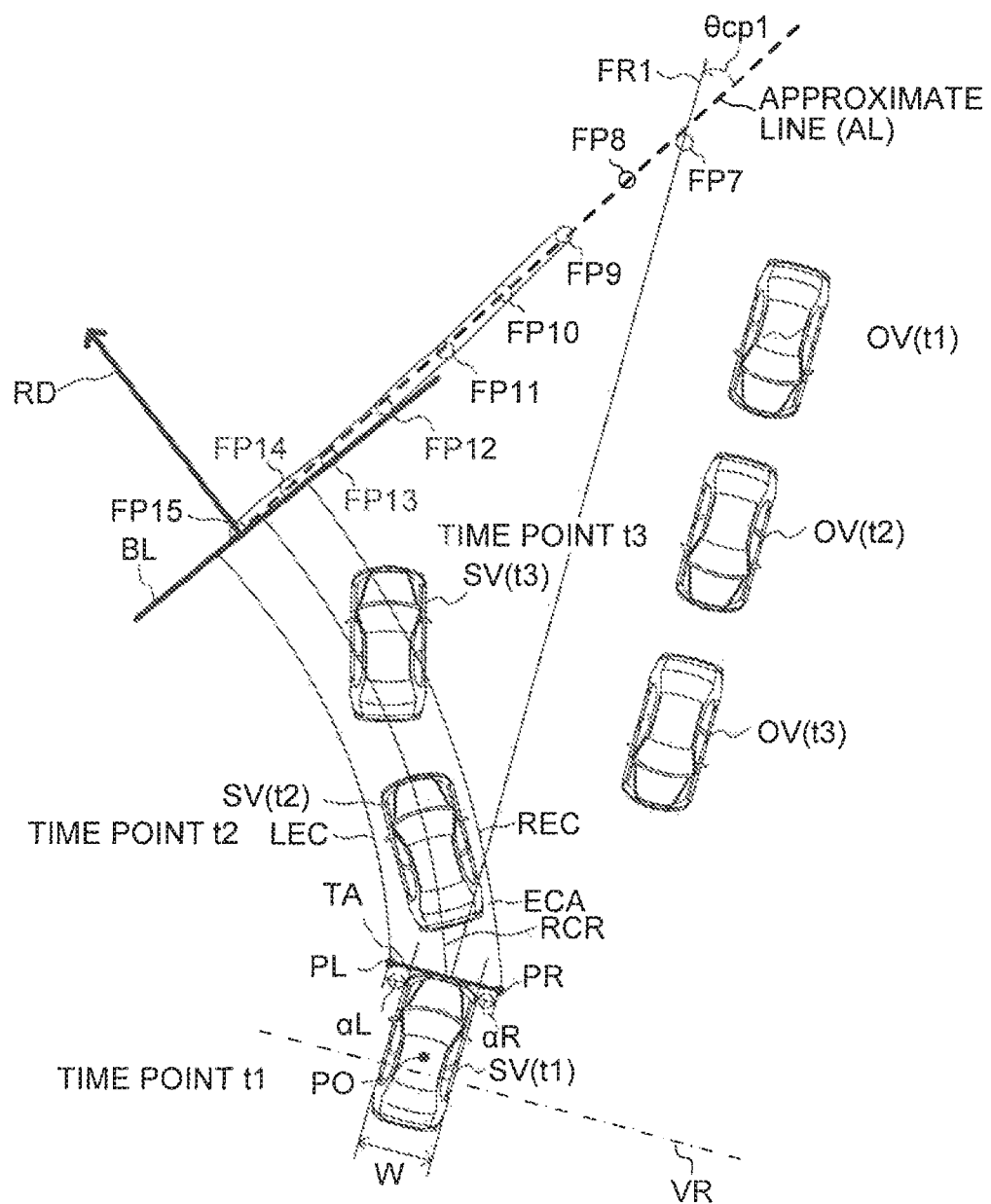
FIG. 6A is a diagram illustrating an outline of a process for calculating the continuous structure angle at one time point when a certain steering operation for the continuous structure is being operated.
Figure 6B:
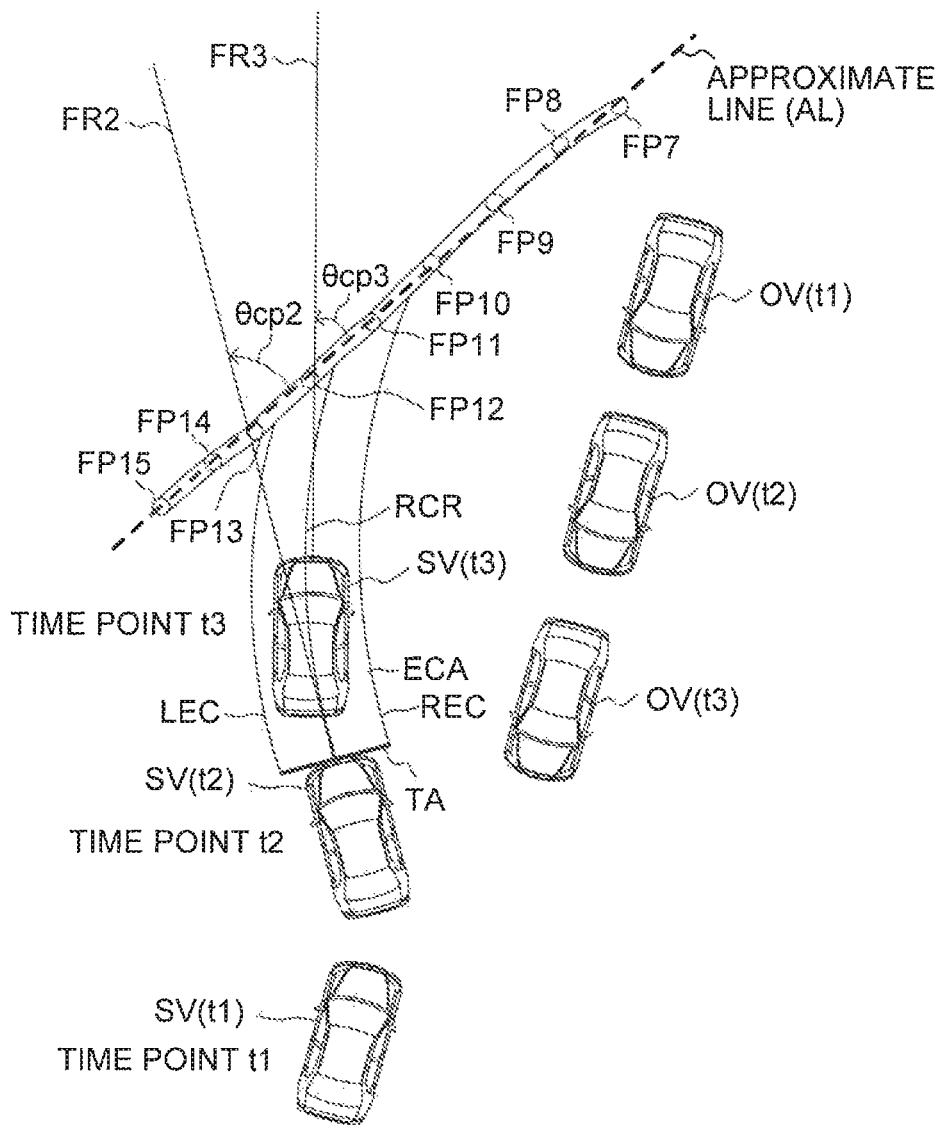
FIG. 6B is a diagram illustrating an outline of a process for calculating the continuous structure angle at next one time point when a predetermined time period elapses from the one time point illustrated in FIG. 6A.

A trajectory/path of the own vehicle SV when the driver performs a steering operation in order to prevent the own vehicle SV from colliding with other vehicle OV in the vicinity of the continuous structure is illustrated in FIG. 6A and FIG. 6B.

As shown in FIG. 6A, the own vehicle SV is turning left in order to prevent the own vehicle SV from colliding with the other vehicle OV at a time point t1, and the longitudinal axis direction FR1 of the own vehicle SV still tilts to the right side on the paper plane of FIG. 6A at the time point t1. Since the own vehicle SV is turning left, the predicted traveling path RCR curves as illustrated in FIG. 6A. At the time point t1, the obstacle points that are predicted to intersect the front end area TA are the feature points FP15 and FP14. The time to collision TTC of the obstacle point FP15 is minimum between the obstacle points FP15 and FP14. Since the driver of the own vehicle SV is performing the steering operation in order to prevent the own vehicle SV from colliding with the other vehicle OV from the time point t1 to the time point t3, it is assumed that the other vehicle OV is predicted not to intersect the front end area TA of the own vehicle SV so that the other vehicle OV is not the obstacle.

In the example shown in FIG. 6A, all feature points FP14 through FP7 except the obstacle point FP15 which is selected as the base point are located in a side of the traveling direction RD with respect to the base line BL which is a line extending perpendicularly to the traveling direction RD at the base point. It is assumed that the first device selects the feature points FP14 through FP9 as the continuous points in the forward direction of the base point FP15. When the feature point FP9 is selected as the continuous point, the total of the distance between the continuous points in the forward direction is longer/larger than the continuous structure determining distance. Thus, the first device determines that the obstacle including the obstacle point FP15 is the continuous structure. In this case, the feature point FP9 is the end point of the continuous structure in the forward direction. The first device starts/tries to select the continuous points in the opposite direction of the base point FP15. However, the continuous point is not selected. Thus, the feature point FP15 becomes the end point of the continuous structure in the opposite direction.

Next, the first device calculates the approximate line AL of the continuous structure. The continuous structure at the time point t1 illustrated in FIG. 6A includes the feature points FP15 through FP9 as the components, unlike the components included in the continuous structure illustrated in FIG. 3. Thus, the approximate line AL at the time point t1 is illustrated as an approximate line AL1 in FIG. 6A. Furthermore, the first device calculates, as the continuous structure angle θcp1, the angle θcp1 of the approximate line AL1 at the time point t1 in relation to the longitudinal axis direction FR of the own vehicle SV.

Figure 7:
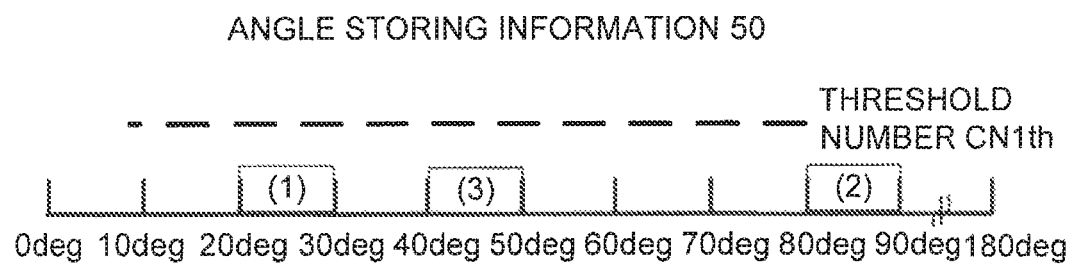
FIG. 7 is a diagram illustrating the angle storing information where the continuous structure angles illustrated in FIGS. 6A and 6B are stored.

When it is assumed that a magnitude of the continuous structure angle θcp1 at the time point t1 in FIG. 6A falls within the angle range between 20 deg and 30 deg, the first device increments the calculation number CN corresponding to the angle range between 20 deg and 30 deg in the angle storing information 50 by "1". Thus, as illustrated in FIG. 7, the calculation number CN corresponding to the angle range between 20 deg and 30 deg becomes "1" in the angle storing information 50. At this time point, the calculation numbers CN corresponding to the other angle ranges in the angle storing information 50 are "0". Accordingly, since there is no angle range whose calculation number CN is larger than the threshold number CN1th in the angle storing information 50, the first device does not perform the collision preventing control.

The own vehicle SV travels along the predicted traveling path RCR predicted at the time point t1 between the time point t1 and the time point t2. It is assumed that the driver starts to perform the steering operation to a right direction at the time point t2. In this case, the predicted traveling path RCR of the own vehicle SV at the time point t2 is a trajectory/path illustrated in FIG. 6B.

At the time point t2, the feature points FP12 and FP11 are selected as the obstacle points. The time to collision TTC of the obstacle point FP12 is minimum between the obstacle points FP12 and FP11. The continuous structure at the time point t2 illustrated in FIG. 6B includes the feature points FP15 through FP7 as the components, similarly to the continuous structure at the time point t1 illustrated in FIG. 3. Thus, the approximate line AL at the time point t2 illustrated in FIG. 6B is the same as the approximate line AL at the time point t1 illustrated in FIG. 3. The first device calculates, as the continuous structure angle θcp2, the angle θcp2 of the approximate line AL1 in relation to the longitudinal axis direction FR2 of the own vehicle SV at the time point t2.

When it is assumed that a magnitude of the continuous structure angle θcp2 at the time point t2 illustrated in FIG. 6B falls within the angle range between 80 deg and 90 deg, the first device increments the calculation number CN corresponding to the angle range between 80 deg and 90 deg in the angle storing information 50 by "1". Thus, as illustrated FIG. 7, the calculation number CN corresponding to the angle range between 80 deg and 90 deg becomes "1" in the angle storing information 50. At this time point, each of the calculation number CN corresponding to the angle range between 20 deg and 30 deg and the calculation number CN corresponding to the angle range between 80 deg and 90 deg is "1", and the calculation numbers CN corresponding to the other angle ranges in the angle storing information 50 are "0".

There is no angle range whose calculation number CN is larger than the threshold number CN1th in the angle storing information 50, at this time point t2. Thus, even though the minimum time to collision TTC at the time point t2 is equal to or less than the threshold time period T1th, the first device does not perform the collision preventing control.

The own vehicle SV travels along the predicted traveling path RCR predicted at the time point t2 between the time point t2 and the time point t3. It is assumed that the driver is still performing the same steering operation at the time point t3 as the steering operation at the time point t2. In this case, the predicted traveling path RCR of the own vehicle SV at the time point t3 remains the same as one predicted at the time point t2.

At the time point t3, unlike at the time points t1 and t2, the feature points FP14 through FP7 are detected, and the feature point FP15 is not detected. Further, the obstacle point whose time to collision TTC is minimum at the time point t3 is the feature point FP12, similarly to that at the time point t2. The components included in the continuous structure at the time point t3 are the feature points FP14 through FP7. Since the feature point FP15 is not the component included in the continuous structure, the approximate line of the continuous structure at the time point t3 is different from the approximate line AL at the time point t2. The approximate line at the time point t3 is not illustrated in FIG. 6B. The first device calculates, as the continuous structure angle θcp3, the angle θcp3 of the approximate line of the continuous structure at the time point t3 in relation to the longitudinal axis direction FR3 of the own vehicle SV at the time point t3.

When it is assumed that a magnitude of the continuous structure angle θcp3 at the time point t3 illustrated in FIG. 6B falls within the angle range between 40 deg and 50 deg, the first device increments the calculation number CN corresponding to the angle range between 40 deg and 50 deg in the angle storing information 50 by "1". Thus, the calculation number CN corresponding to the angle range between 40 deg and 50 deg becomes "1" in the angle storing information 50, as illustrated in FIG. 7. At this time point, the calculation number CN corresponding to each of the angle range between 20 deg and 30 deg, the angle range between 40 deg and 50 deg, and the angle range between 80 deg and 90 deg is "1", and the calculation numbers CN corresponding to the other angle ranges in the angle storing information 50 are "0".

Since there is no angle range whose calculation number CN is larger than the threshold number CN1th in the angle storing information 50 at the time point t3, the first device dose not perform the collision preventing control at the time point t3.

The driver performs the steering operation to prevent the own vehicle SV from colliding with the continuous structure after the time point t3 in FIG. 6B. Accordingly, the continuous structure will not intersect with the front end area TA of the own vehicle SV, and the continuous structure is not selected as the obstacle. In the above manner, even when the driver performs the steering operation toward the continuous structure's side at a position in the vicinity of the continuous structure in order to prevent the own vehicle SV from colliding with the other vehicle OV, the continuous structure angle θcp thereafter greatly changes, and thus, the collision preventing control is not performed. Accordingly, when such a steering operation is performed, the possibility that the driver is annoyed due to an unnecessary collision preventing control is reduced.

As described above, the first device determines whether or not the obstacle including the obstacle point whose time to collision TTC is minimum is the continuous structure, every time a predetermined time period elapses. When the obstacle is determined to be the continuous structure, the first device calculates the continuous structure angle θcp of the continuous structure. The first device increments the "calculation number CN corresponding to the angle range within which the magnitude of the calculated continuous structure angle θcp falls" by "1" in the angle storing information 50. When the obstacle including the obstacle point whose time to collision TTC is minimum is determined to be the continuous structure, and there is no angle range whose calculation number CN is larger than the threshold number CN1th, the first device prohibits itself from performing the collision preventing control. On the other hand, if the obstacle including the obstacle point whose time to collision TTC is minimum is determined to be the continuous structure, and there is any angle range whose calculation number CN is larger than the threshold number CN1th, the first device performs the collision preventing control when the minimum time to collision TTC is equal to or shorter than the threshold time period T1th.

When the driver is performing a certain steering operation (the steering operation to prevent the own vehicle from colliding with the continuous structure or the other vehicle OV) at the position in the vicinity of the continuous structure, the continuous structure angle θcp changes as time elapses. Accordingly, it is unlikely that a condition that there is any angle ranges whose calculation number CN is/becomes larger than the threshold number CN1th is satisfied. Therefore, when the driver is performing some steering operation against the continuous structure, it is likely that the first device prohibits itself from performing the collision preventing control. Accordingly, the driver is unlikely to be annoyed due to an unnecessary collision preventing control.

Further, when the obstacle is the continuous structure which is installed along a curve, and the driver starts to perform the steering operation in order to have the own vehicle move along the curve at a starting point of the curve, the continuous structure angle θcp tends to greatly change as the time elapses. Accordingly, when the own vehicle SV reaches the start point of the curve and the driver starts to perform the steering operation along the curve, the first device can certainly reduce possibility that there is any angle ranges having the calculation number CN larger than the threshold number CN1th stored in the angle storing information 50. Thus, when the driver is performing the steering operation along the curve, the possibility that the collision preventing control is performed is certainly reduced. Consequently, in such a case, the possibility that the driver is annoyed is reduced.

<Specific Operation>

Figure 8:
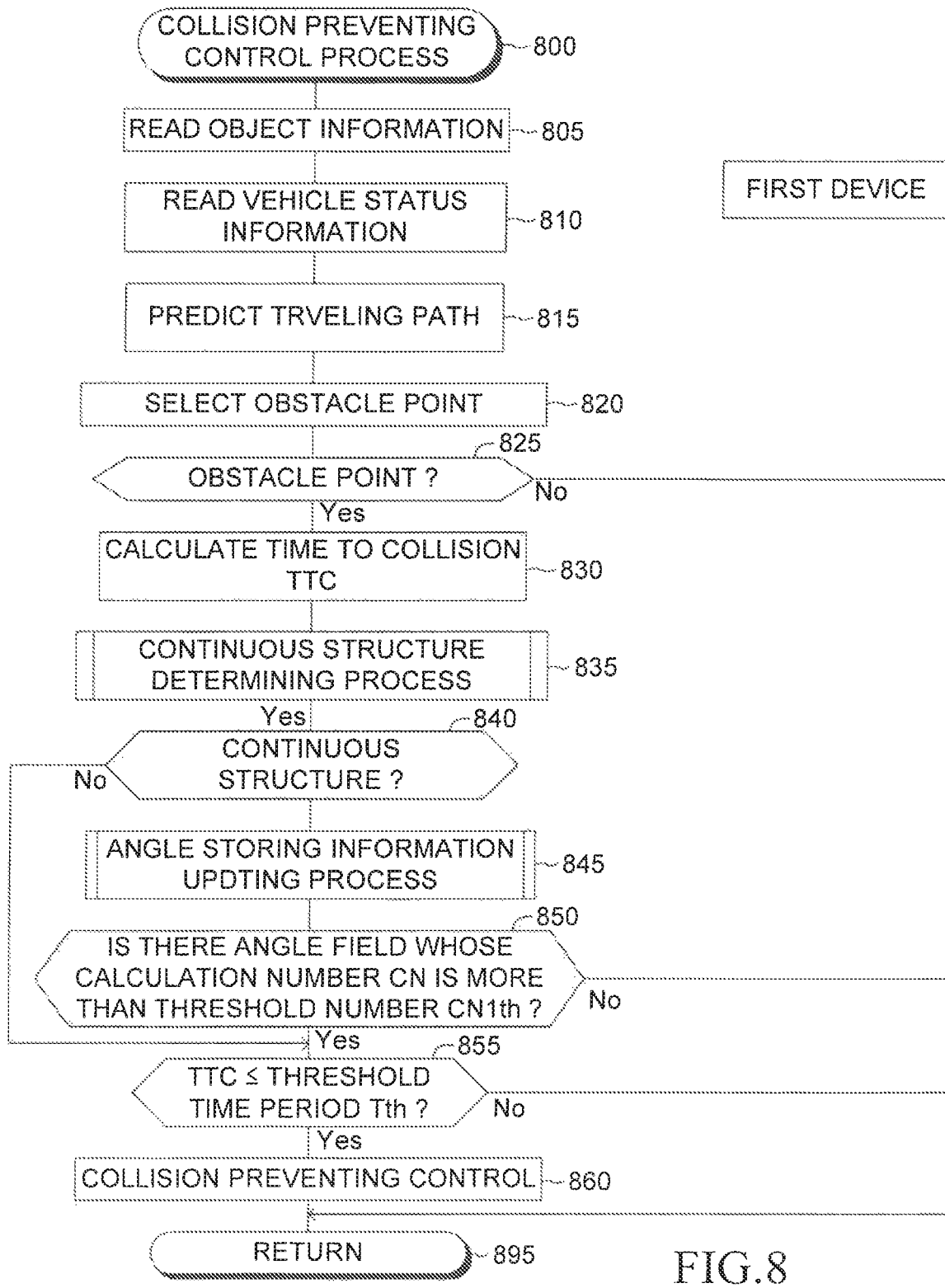
FIG. 8 is a flowchart illustrating a routine which is executed by a CPU of a collision preventing ECU illustrated in FIG. 1.

The CPU 31 of the collision preventing ECU 10 executes a routine represented by a flowchart shown in FIG. 8, every time a predetermined time period elapses. The routine shown in FIG. 8 is a routine for performing the collision preventing control for the obstacle.

When a predetermined timing has come, the CPU 31 starts the process from Step 300 shown in FIG. 8, sequentially executes processes of Steps 805 through 820 described below in those order, and proceeds to Step 825.

Step 805: The CPU 31 reads out the object information which the camera sensor 11 obtains.

Step 810: The CPU 31 reads out the vehicle status information which the vehicle status sensor 12 obtains.

Step 815: As described above, the CPU 31 predicts the predicted traveling path RCR based on the vehicle status information which the CPU 31 reads out at Step 810.

Step 820: As described above, the CPU 31 selects, based on the object information obtained at Step 805 and the predicted traveling path RCR which the CPU 31 predicts at Step 815, the obstacle point among the feature points included in the object information.

Subsequently, the CPU 31 proceeds to Step 825 to determine whether or not the obstacle point has been selected at Step 820. When the obstacle has not been selected at Step 820, there is no obstacle which has probability of colliding with the own vehicle SV, and thus, the CPU 31 does not have to perform the collision preventing control. Therefore, the CPU 31 makes a "No" determination at Step 825, and proceeds to Step 895 so as to tentatively terminate the present routine. As a result, the collision preventing control is not performed.

On the other hand, when the obstacle point has been selected at Step 820, the CPU 31 makes a "Yes" determination at Step 825 to proceed to Step 830.

Step 830: As described above, the CPU 31 calculates the time to collision TTC for each of the obstacle points which the CPU 31 selects at Step 820.

Subsequently, the CPU 31 proceeds to Step 835 to perform a continuous structure determining process for determining whether or not the obstacle including the obstacle point whose time to collision TTC is minimum is the continuous structure. In actuality, when the CPU 31 proceeds to Step 835, the CPU 31 executes a subroutine represented by flowcharts shown in FIGS. 9A and 9B.

More specifically, when the CPU 31 proceeds to Step 835, the CPU 31 starts the process from Step 900, and proceeds to Step 905 to select, as the base point, the obstacle point whose time to collision TTC is minimum. Then, the CPU 31 proceeds to Step 910.

At Step 910, the CPU 31 sets, as the forward direction, the traveling direction RD of the predicted traveling path RCR at the base point, and proceeds to Step 915. At Step 915, the CPU 31 executes the forward direction selecting process for selecting the continuous points which satisfy the continuous point conditions (A) and (B) in the forward direction. In actuality, when the CPU 31 proceeds to Step 915, the CPU 31 executes a subroutine represented by a flowchart shown in FIG. 10.

More specifically, when the CPU 31 proceeds to Step 915, the CPU 31 starts the process from Step 1000, and proceeds to Step 1005. At Step 1005, the CPU 31 selects, as the processing point, the feature point which is the closest to the base point among the feature points located/positioned in the side of the forward direction (the traveling direction RD) with respect to the base line BL, and proceeds to Step 1010.

At Step 1010, the CPU 31 determines whether or not the forward direction from the obstacle point whose time to collision TTC is minimum satisfies a condition that a distance between any points located along the forward direction and the own vehicle SV becomes longer. When the forward direction from the obstacle point whose time to collision TTC is minimum satisfies the condition that the distance between any points located along the forward direction and the own vehicle SV becomes longer, the CPU 31 makes a "Yes" determination at Step 1010, and proceeds to Step 1015. At Step 1015, the CPU 31 obtains a subtraction value D by subtracting a "distance (RB) between the base point and the own vehicle SV" from a "distance (RO) between the processing point and the own vehicle SV", and proceeds to Step 1025. The "distance (RO) between the processing point and the own vehicle SV" and the "distance (RB) between the base point and the own vehicle SV" are included in the object information.

On the other hand, when the forward direction from the obstacle point whose time to collision TTC is minimum satisfies a condition that a distance between any points located along the forward direction and the own vehicle SV becomes shorter, the CPU 31 makes a "No" determination at Step 1010, and proceeds to Step 1020. At Step 1020, the CPU 31 obtains the subtraction value D by subtracting the "distance (RO) between the processing point and the own vehicle SV" from the "distance (RB) between the base point and the own vehicle SV", and proceeds to Step 1025.

At Step 1025, the CPU 31 determines whether or not the subtraction value D which is calculated at Step 1015 or Step 1020 is larger than a threshold D1th and the subtraction value D is smaller than a threshold D2th. In other words the CPU 31 determines whether or not the subtraction value D falls within a predetermined range. The threshold D1th is set to be smaller than the threshold D2th. The threshold D1th may be a negative value. In the present example, the threshold D1th is set to be "−0.25 m", and the threshold D2th is set to be "6.0 m".

Now, the reason why the threshold D1th is set to the negative value is described. The subtraction value D calculated at Step 1015 or Step 1020 is a value obtained by subtracting a "distance between the own vehicle SV and one of points selected from the base point and the processing point whichever closer to the vehicle SV" from a "distance between the own vehicle SV and the other point selected from the base point and the processing point whichever farther away from the vehicle SV. However, the subtraction value D may sometimes be negative even when the two feature points are selected as the base point and the processing point as described above, for the following reasons.

A difference between a distance from "one of the feature points located in the vicinity of an extended line of the longitudinal axis of the own vehicle SV" to the own vehicle SV and a distance from the other of the feature points to the own vehicle SV is small.

The distance between the feature point and the own vehicle SV included in the object information may have an error.

Thereby, the threshold D1th is set at the negative value.

When the subtraction value D calculated at Step 1015 or Step 1020 is larger than the threshold D1th and is smaller than the threshold D2th, in other words, the subtraction value D falls within the predetermined range, the processing point satisfies the above continuous point condition (A). In this case, the CPU 31 makes a "Yes" determination at Step 1025 to proceed to Step 1030.

At Step 1030, the CPU 31 calculates the distance L between the base point and the processing point, and proceeds to Step 1035. At Step 1035, the CPU 31 determines whether or not the distance L calculated at Step 1030 is smaller/shorter than the threshold distance L1th.

When the distance L is smaller/shorter than the threshold distance L1th, the processing point satisfies the above continuous point condition (B). In this case, the CPU 31 makes a "Yes" determination at Step 1035, and proceeds to Step 1050. At Step 1050, the CPU 31 stores the base point and the processing point as the continuous point in the forward direction in the RAM 33, and proceeds to Step 1095 to tentatively terminate the present routine. Thereafter, the CPU 31 proceeds to Step 920 in FIG. 9A.

Figure 9A:
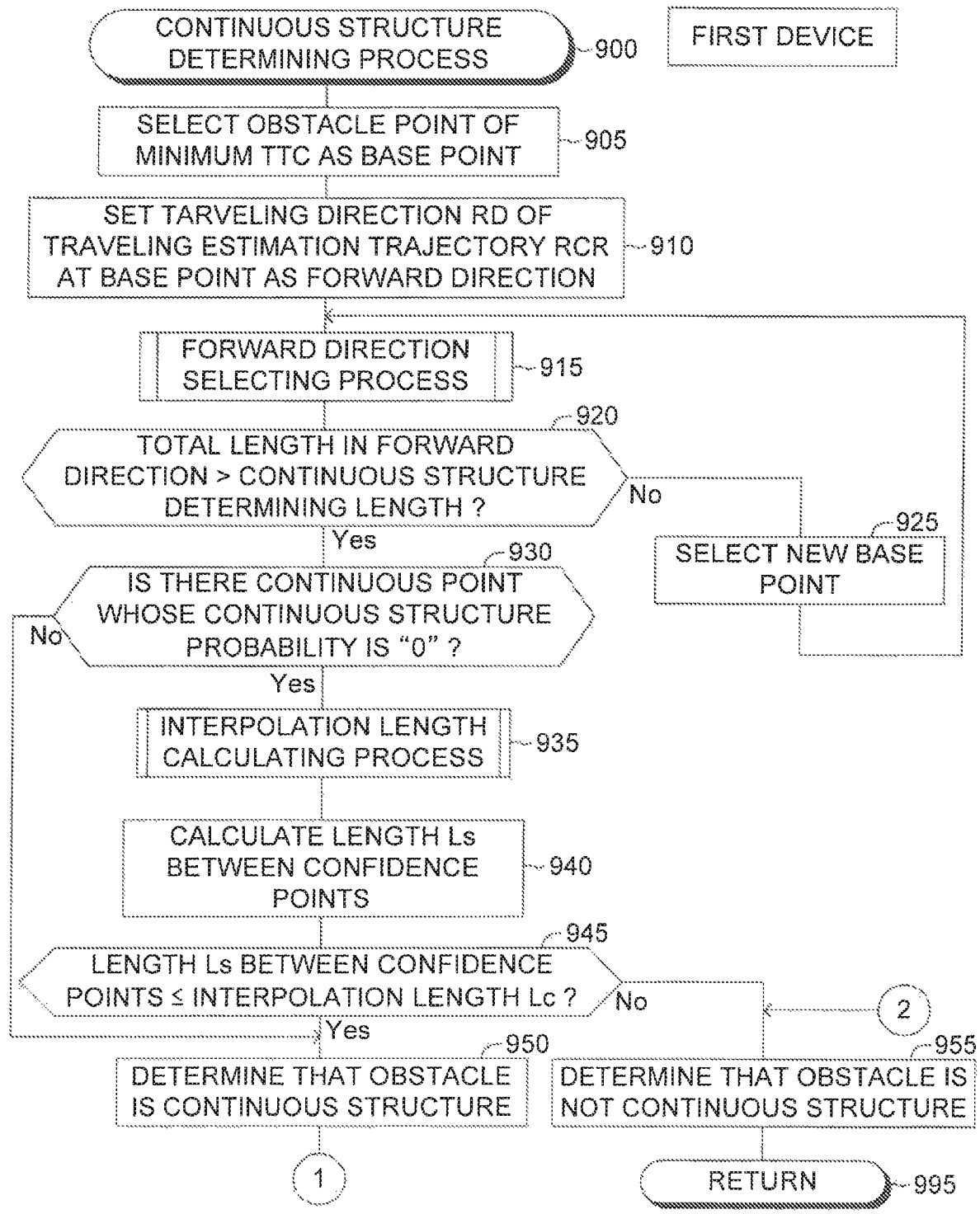
FIG. 9A is a flowchart illustrating a first half of a routine which is executed by the CPU of the collision preventing ECU in a continuous structure determining process included in the routine illustrated in FIG. 8.

At Step 920 shown in FIG. 9A, the CPU 31 determines whether or not the total of the distance between the continuous points in the forward direction is larger than the continuous structure determining distance. The continuous structure determining distance is set to be an appropriate value which has been determined by experiments or the like. The continuous structure determining distance may be referred to as a "first threshold distance".

When the total of the distance between the continuous points in the forward direction is equal to or smaller than the continuous structure determining distance, the CPU 31 makes a "No" determination at Step 920, and proceeds to Step 925. At Step 925, the CPU 31 selects, as a new base point, the processing point which has already been selected as the continuous point at Step 915, and executes Step 915 again.

On the other hand, when the total of the distance between the continuous points in the forward direction is larger than the continuous structure determining distance, the CPU 31 makes a "Yes" determination at Step 920, and proceeds to Step 930. At Step 930, the CPU 31 determines whether or not there is the continuous point whose continuous structure probability is "0" among continuous points selected at Step 915. As described above, the continuous structure probability of each of the feature points is included in the object information.

When there is no continuous point whose continuous structure probability is "0" among the continuous points selected at Step 915, the total of the distance between the continuous points whose continuous structure probabilities are "1" is larger than the continuous structure determining distance. The continuous points are located/position "in the forward direction RD of the predicted traveling path RCR from the obstacle point whose time to collision TTC is minimum". Therefore, the CPU 31 makes a "Yes" determination at Step 930, and proceeds to Step 950. At Step 950, the CPU 31 determines the obstacle including the obstacle point whose time to collision TTC is minimum is the continuous structure, and proceeds to Step 960 shown in FIG. 9B.

At step 960, the CPU 31 selects the obstacle point whose time to collision TTC is minimum as the base point again, and proceeds to Step 965.

Figure 10:
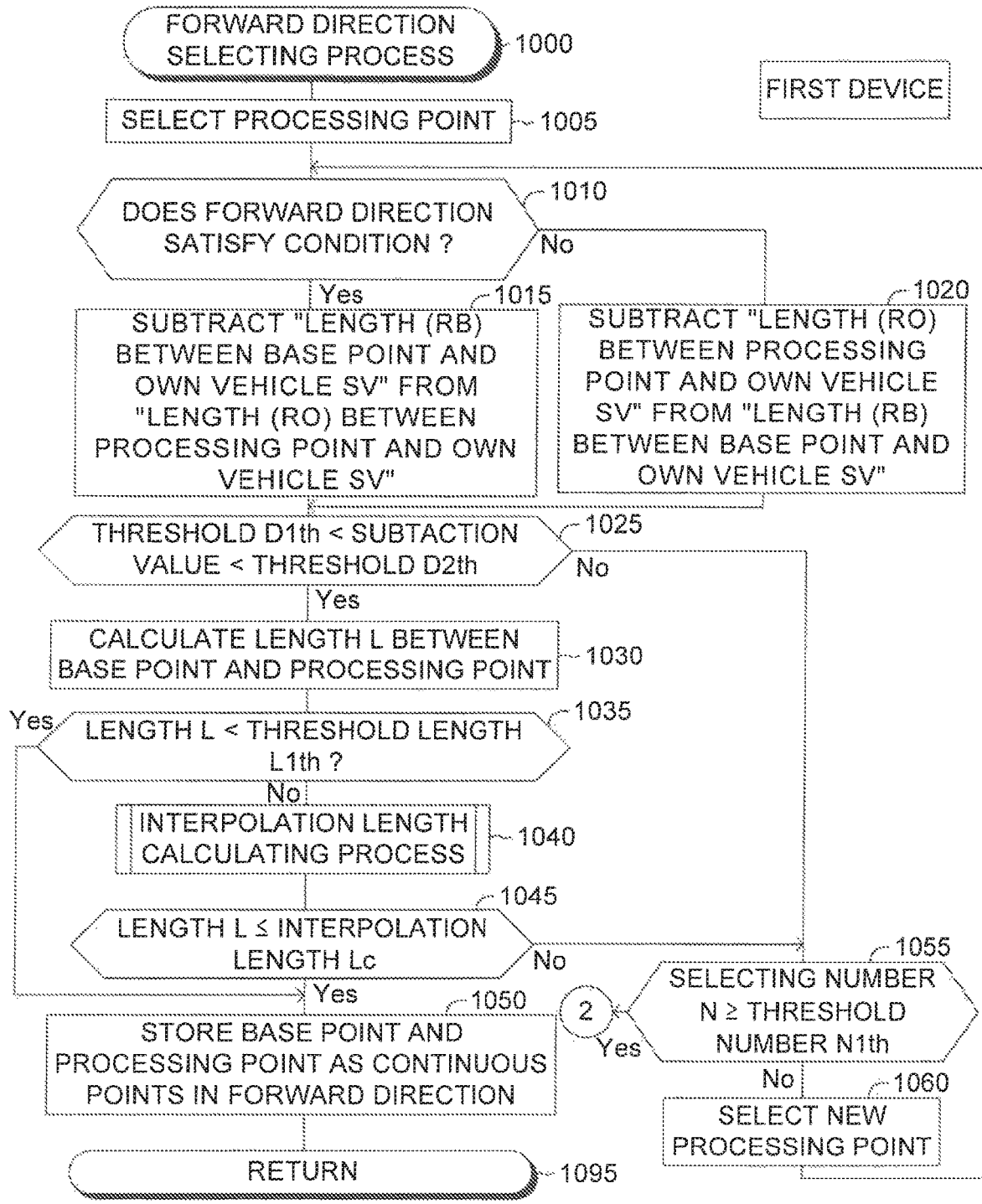
FIG. 10 is a flowchart illustrating a routine which is executed by the CPU of the collision preventing ECU in a forward direction selecting process included in the routine illustrated in FIG. 9A.
Figure 11:
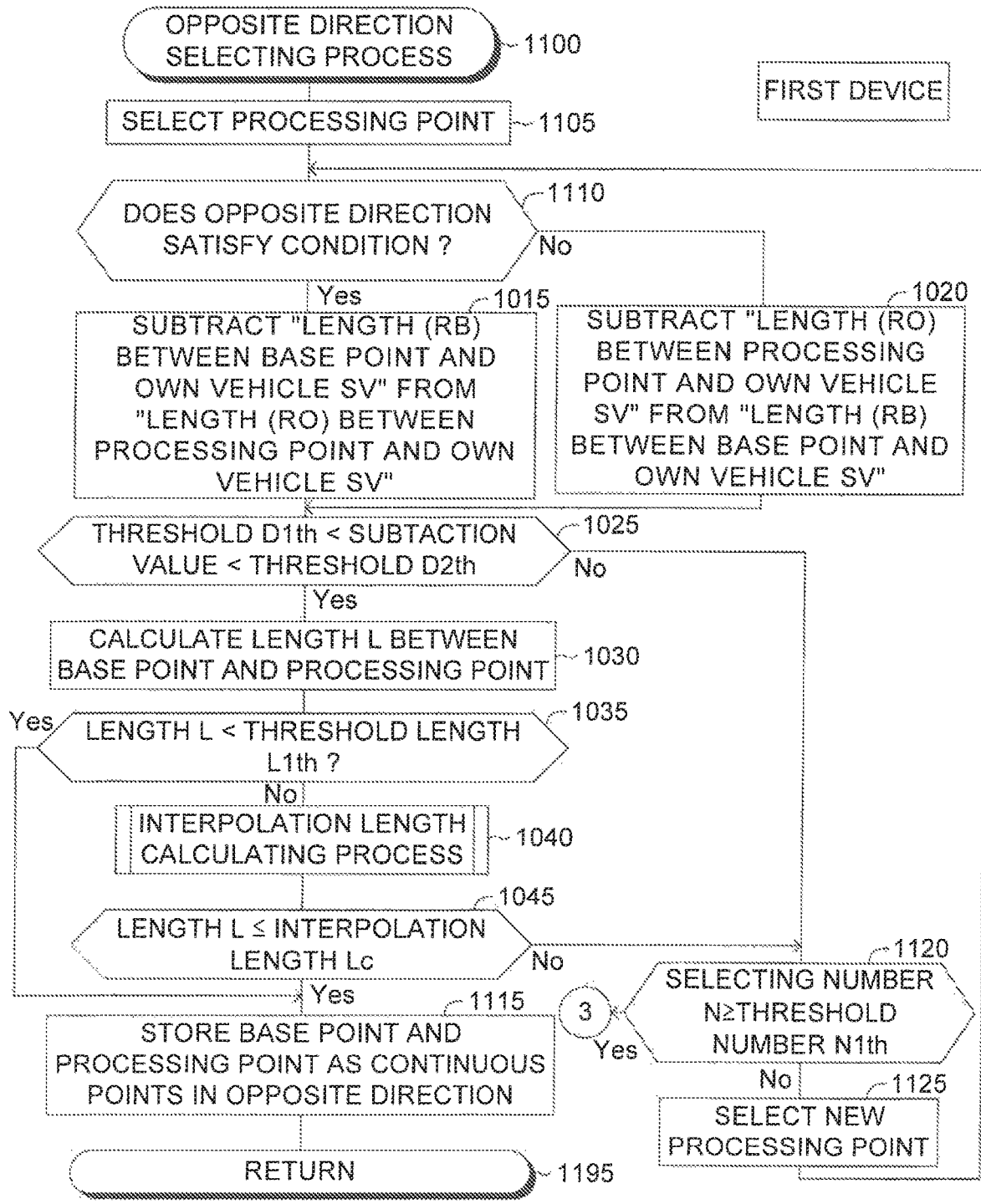
FIG. 11 is a flowchart illustrating a routine which is executed by the CPU of the collision preventing ECU in a opposite direction selecting process included in the routine illustrated in FIG. 9B.

At Step 965, the CPU 31 executes the opposite direction selecting process for selecting the continuous points which satisfy both of the continuous point conditions (A) and (B) in the opposite direction which is opposite to the forward direction. In actuality, when the CPU 31 proceeds to Step 965, the CPU 31 executes a subroutine represented by a flowchart shown in FIG. 11. In FIG. 11, the same steps as the steps shown in FIG. 10 are denoted by common step symbols, and descriptions thereof are omitted.

More specifically, when the CPU 31 proceeds to Step 965, the CPU 31 starts the process from Step 1100, and proceeds to Step 1105. At Step 1105, the CPU 31 selects, as the processing point, the closest feature point to the base point among the feature points in the side of the opposite direction which is opposite to the forward direction from the base line BL, and proceeds to Step 1110.

At Step 1110, the CPU 31 determines whether or not the opposite direction from the obstacle point whose time to collision TTC is minimum satisfies a condition that a distance between any points located along the opposite direction and the own vehicle SV becomes longer. When the opposite direction from the obstacle point whose time to collision TTC is minimum satisfies the condition that a distance between any points located along the opposite direction and the own vehicle SV becomes longer, the CPU 31 makes a "Yes" determination at Step 1110, and proceeds to Step 1015. At Step 1015, the CPU 31 obtains the subtraction value D by subtracting the "distance (RB) between the base point and the own vehicle SV" from the "distance (RO) between the processing point and the own vehicle SV", and proceeds to Step 1025.

On the other hand, when the opposite direction from the obstacle point whose time to collision TTC is minimum satisfies a condition that a distance between any points located along the opposite direction and the own vehicle SV becomes shorter, the CPU 31 makes a "No" determination at Step 1110, and proceeds to Step 1020. At Step 1020, the CPU 31 obtains the subtraction value D by subtracting the "distance (RO) between the processing point and the own vehicle SV" from the "distance (RB) between the base point and the own vehicle SV", and proceeds to Step 1025.

At Step 1025, the CPU 31 determines whether or not the subtraction value D calculated at Step 1015 or Step 1020 is larger than the threshold D1th and is smaller than the threshold D2th.

When the subtraction value D calculated at Step 1015 or Step 1020 is larger than the threshold D1th and is smaller than the threshold D2th, the processing point satisfies the above continuous point condition (A). In this case, the CPU 31 makes a "Yes" determination at Step 1025, and proceeds to Step 1030. At Step 1030, the CPU 31 calculates the distance L between the base point and the processing point, and proceeds to Step 1035. At Step 1035, the CPU 31 determines whether or not the distance L which is calculated at Step 1030 is shorter than the threshold distance L1th.

When the distance L is shorter than the threshold distance L1th, the processing point satisfies the above continuous point condition (B). In this case, the CPU 31 makes a "Yes" determination at Step 1035, and proceeds to Step 1115. At Step 1115, the CPU 31 stores the base point and the processing point as the continuous point in the opposite direction in the RAM 33, and proceeds to Step 1195 to tentatively terminate the present routine. Thereafter, the CPU 31 proceeds to Step 970 in FIG. 9B.

Figure 9B:
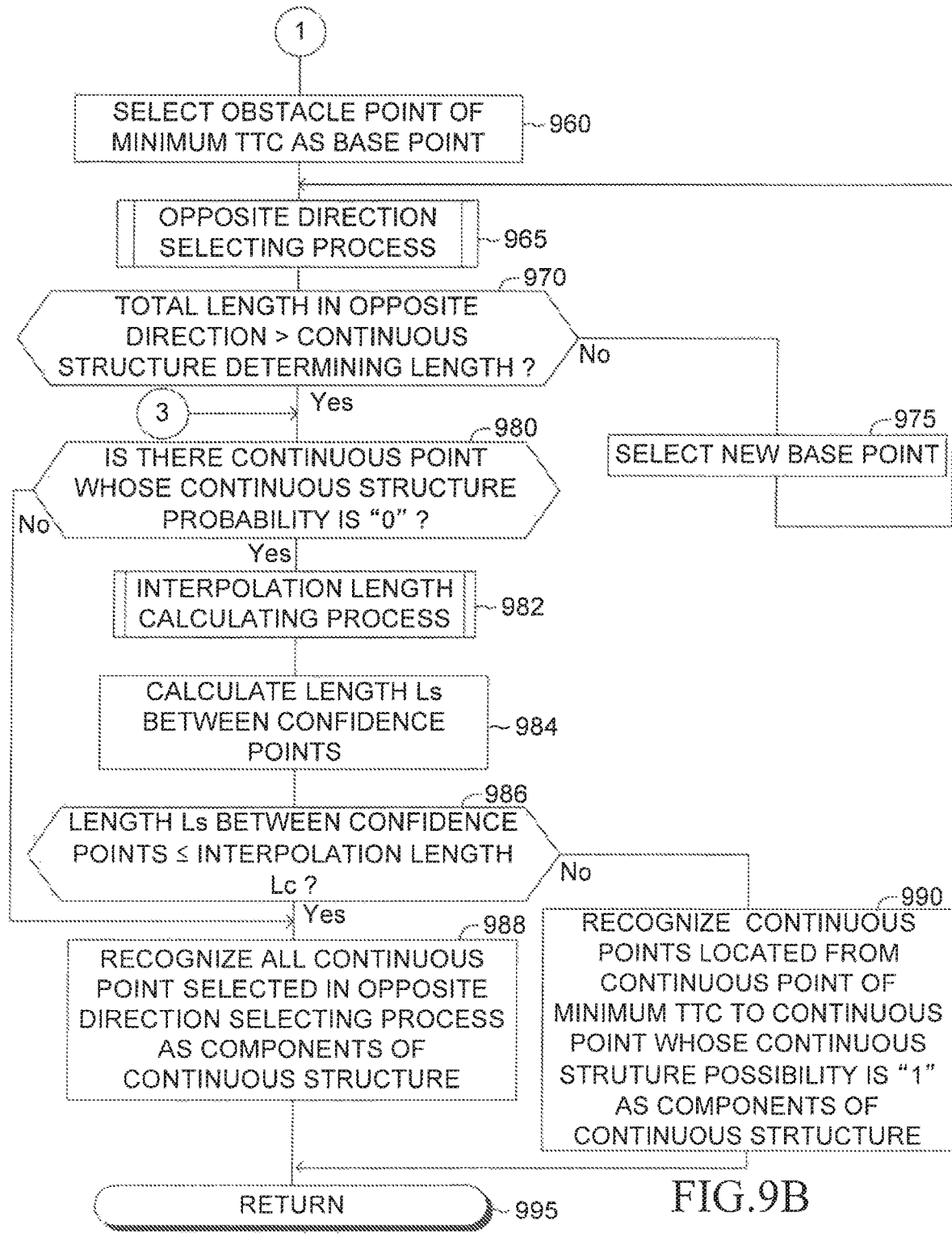
FIG. 9B is a flowchart illustrating a second half of the routine which is executed by the CPU of the collision preventing ECU in the continuous structure determining process included in the routine illustrated in FIG. 8.

At Step 970 shown in FIG. 9B, the CPU 31 determines whether or not the total of the distance between the continuous points in the opposite direction is larger than the continuous structure determining distance.

When the total of the distance between the continuous points in the opposite direction is equal to or smaller than the continuous structure determining distance, the CPU 31 makes a "No" determination at Step 970, and proceeds to Step 975. At Step 975, the CPU 31 selects, as a new base point, the processing point which has already been selected as the continuous point at Step 965, and executes Step 965 again.

On the other hand, when the total of the distance between the continuous points in the opposite direction is larger than the continuous structure determining distance, the CPU 31 makes a "Yes" determination at Step 970, and proceeds to Step 980. At Step 980, the CPU 31 determines whether or not there is the continuous point whose continuous structure probability is "0" among the continuous points selected at Step 965.

When there is no continuous point whose continuous structure probability is "0" among the continuous points selected at Step 965, the total of the distance between the continuous points whose continuous structure probabilities are "1" is larger than the continuous structure determining distance. The continuous points are located/positioned "in the opposite direction which is opposite to the traveling direction RD from the obstacle point whose time to collision TTC is minimum". In this case, the CPU 31 makes a "Yes" determination at Step 980, and proceeds to Step 988. At Step 988, the CPU 31 recognizes, as the components included in the continuous structure, the continuous points in the opposite direction selected at 965, and proceeds to Step 995 to tentatively terminate the present routine. Thereafter, the CPU 31 proceeds to Step 840 in FIG. 8.

At Step 840 shown in FIG. 8, the CPU 31 determines whether or not determination result of the continuous structure determining process at Step 835 indicates that the obstacle including the obstacle point whose time to collision TTC is minimum is the continuous structure.

When the determination result of the continuous structure determining process at Step 835 indicates that the obstacle is not the continuous structure, the CPU 31 makes a "No" determination at Step 840 and proceeds to Step 855.

At Step 855, the CPU 31 determines whether or not the minimum time to collision TTC is equal to or shorter/smaller than the threshold time period Tth.

When the minimum time to collision TTC is equal to or shorter/smaller than the threshold time period Tth, the CPU 31 makes a "Yes" determination at Step 855, and proceeds to Step 860. At Step 860, the CPU 31 performs the collision preventing control, and proceeds to Step 895 to tentatively terminate the present routine.

The collision preventing control includes at least one of a braking preventing control (brake prevention control) and a steering preventing control (steering prevention control). In the braking preventing control, braking of the own vehicle SV is automatically to have the own vehicle SV decelerate and to stop in order to prevent the own vehicle SV from colliding with the obstacle. In the steering preventing control, the steering angle of the own vehicle SV is automatically changed in order to prevent the own vehicle SV from colliding with the obstacle.

When performing the braking preventing control, the CPU 31 calculates a target deceleration based on the velocity of the own vehicle SV and the time to collision TTC. More specifically, target deceleration information which defines a "relationship among the velocity of the own vehicle SV, the time to collision TTC, and the target deceleration" is stored in the ROM 32 in a form of a look up table (map). According to the target deceleration information, as the velocity of the own vehicle SV is higher, the (magnitude of) target deceleration is larger. According to the target deceleration information, as the time to collision TTC is smaller/shorter, the (magnitude of) target deceleration is larger.

The CPU 31 refers to the target deceleration information so as to determine the target deceleration according to the velocity of the own vehicle SV and the time to collision TTC. Thereafter, the CPU 31 transmits the determined target deceleration to the brake ECU 20. In this case, the brake ECU 20 controls the brake actuator 22 such that an actual deceleration of the own vehicle SV coincides with the target deceleration so as to generate necessary braking force.

When performing the steering preventing control, the CPU 31 calculates a target steering angle necessary for avoiding the obstacle, and transmits the calculated target steering angle to the steering ECU 40. The steering ECU 40 has the motor driver4/ control the steering motor 42 such that an actual steering angle coincides with the target steering angle.

On the other hand, when the minimum time to collision TTC is longer/larger than the threshold time period Tth, the CPU 31 makes a "No" determination at Step 855, and proceeds to Step 895 to tentatively terminate the present routine. As a result, when the minimum time to collision TTC is longer/larger than the threshold time period Tth, the collision preventing control is not performed.

Meanwhile, when the determination result of the continuous structure determining process at Step 835 indicates that the obstacle is the continuous structure, the CPU 31 makes a "Yes" determination at Step 840, and proceeds to Step 845. At Step 845, the CPU 31 executes an angle storing information updating process for updating the angle storing information 50. More specifically, at Step 845, the CPU 31 calculates the approximate line AL of the continuous structure, and calculates, as the continuous structure angle θcp, the angle of the approximate line AL in relation to the longitudinal axis direction FR of the own vehicle SV. Then, the CPU 31 increments the calculation number CN corresponding to the angle range within which the magnitude of the calculated continuous structure angle θcp falls by "1" so that the CPU 31 updates the angle storing information 50. In actuality, when the CPU 31 proceeds to Step 845, the CPU 31 executes a subroutine represented by a flowchart shown in FIG. 12.

Figure 12:
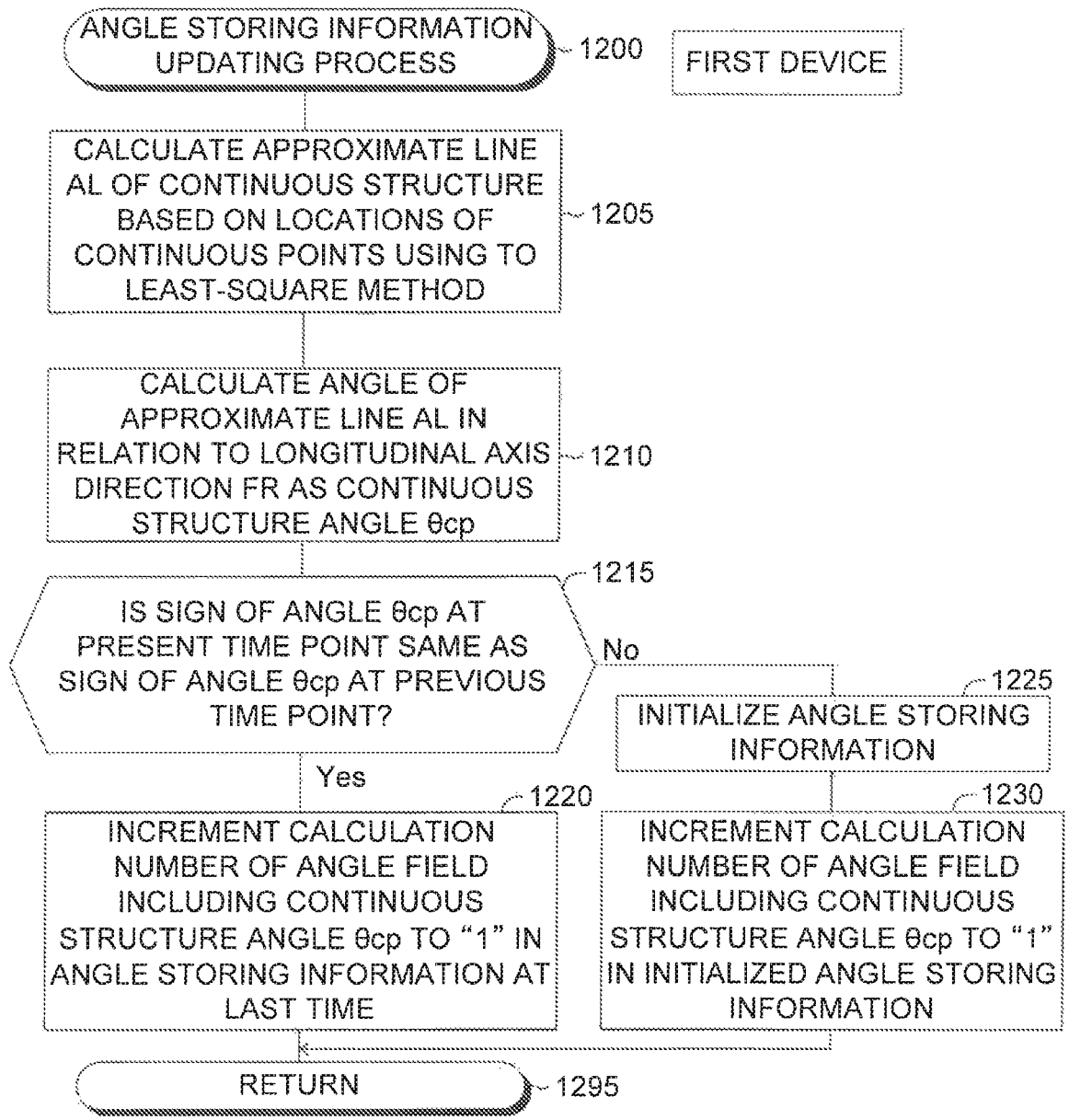
FIG. 12 is a flowchart illustrating a routine which is executed by the CPU of the collision preventing ECU in an angle storing information updating process included in the routine illustrated in FIG. 8.

Specifically, when the CPU 31 proceeds to Step 845, the CPU 31 starts the process from Step 1200 in FIG. 12, and proceeds to Step 1205. At Step 1205, the CPU 31 calculates the approximate line AL of the continuous structure based on the locations/positions of the "feature points which are selected as the components of the continuous structure at Step 835" in relation to the own vehicle SV, and proceeds to Step 1210. The location/position of the feature point in relation to the own vehicle SV is specified by the distance between the feature point and the own vehicle SV and the direction of the feature point in relation to the own vehicle, which are included in the object information. The CPU 31 uses the least-square method for calculating the approximate line AL.

At Step 1210, the CPU 31 calculates, as the continuous structure angle θcp, the angle of the approximate line AL calculated at Step 1205 in relation to the longitudinal axis direction FR of the own vehicle SV, and proceeds to Step 1215.

Figure 13A:
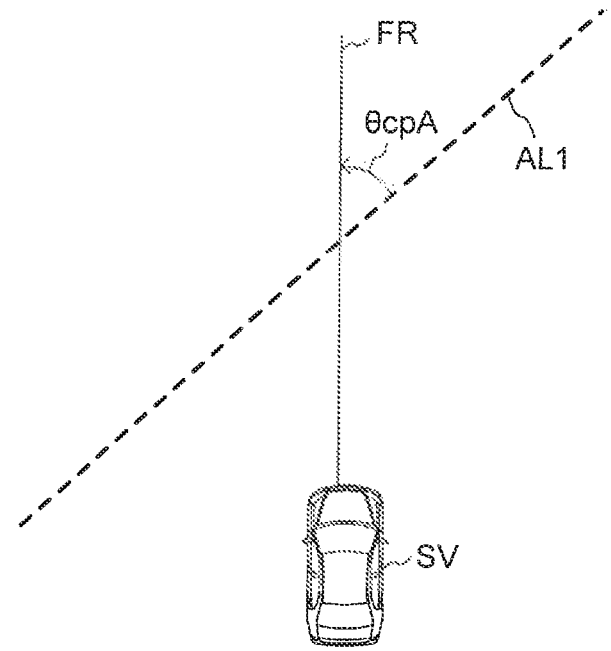
FIG. 13A is a diagram illustrating a relationship between an approximate line and a longitudinal direction of the own vehicle when the continuous structure angle is a positive value.
Figure 13B:
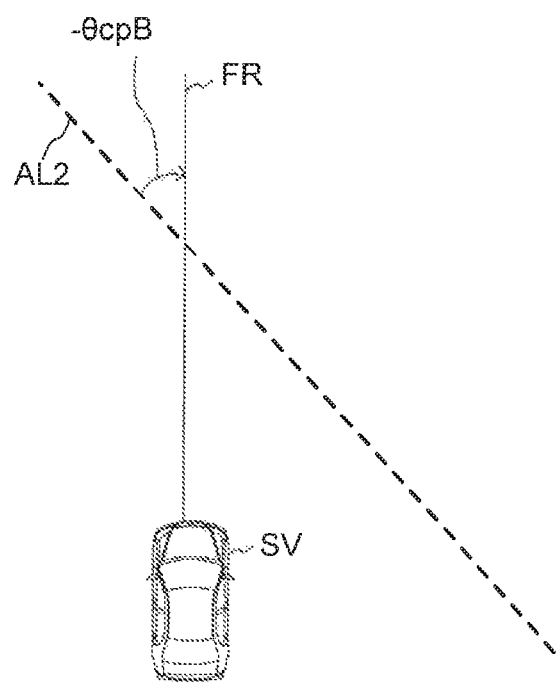
FIG. 13B is a diagram illustrating a relationship between the approximate line and the longitudinal direction of the own vehicle when the continuous structure angle is a negative value.

Now, a sign of the continuous structure angle θcp is described with reference to FIGS. 13 A and 13B. The magnitude of the continuous structure angle θcp is a certain value from 0 deg to 180 deg. In the example shown in FIG. 13A, the direction from the approximate line AL1 to the longitudinal axis direction FR is the counterclockwise direction. Thus, the continuous structure angle θcp is the positive value (θcpA). On the other hand, in the example shown in FIG. 13B, the direction from the approximate line AL2 to the longitudinal axis direction FR is the clockwise direction. Thus, the continuous structure angle θcp is the negative value (−θcpB).

At Step 1215, the CPU 31 determines whether or not the sign of the continuous structure angle θcp calculated at Step 1210 at the present time point is the same as the sign of the continuous structure angle θcp which was calculated at Step 1210 at the previous time point (i.e., when the present routine was executed previously). When the sign of the continuous structure angle θcp calculated at the present time point is the same as the sign of the continuous structure angle θcp calculated at the previous time point, the CPU 31 determines that the continuous structure selected/specified at the present time point is the same as the continuous structure selected/specified at the previous time point, and makes a "Yes" determination at Step 1215 to proceed to Step 1220.

At Step 1220, the CPU 31 increments the calculation number CN corresponding to the angle range within which the magnitude of the continuous structure angle θcp calculated at Step 1210 falls, in the angle storing information 50 by "1". Thereafter, the CPU 31 proceeds to Step 1295 to tentatively terminate the present routine, and proceeds to Step 850 shown in FIG. 8.

When the sign of the continuous structure angle θcp calculated at the present time point is different from the sign of the continuous structure angle θcp calculated at the previous time point, the CPU 31 determines that the continuous structure selected at the present time point is different from the continuous structure selected at the previous time point, and makes a "No" determination at Step 1215 to proceed to Step 1225.

At Step 1225, the CPU 31 initializes the angle storing information 50 stored in the RAM 33, and proceeds to Step 1230. Specifically, the CPU 31 initializes the angle storing information 50 so as to set the calculation numbers CN of all angle ranges in the angle storing information 50 to be "0".

At Step 1230, the CPU 31 increments the calculation number CN corresponding to the angle range within which the magnitude of the continuous structure angle θcp calculated at Step 1210 falls, in the initialized angle storing information 50, by "1". Thereafter, the CPU 31 proceeds to Step 1295 to tentatively terminate the present routine, and proceed to Step 850 shown in FIG. 8.

In this manner, when the continuous structure selected at the present time point is different from the continuous structure selected at the previous time points, the "calculation numbers CN corresponding to the angle ranges except the angle range within which the magnitude of the continuous structure angle θcp calculated at the present time point falls" is initialized, and the "calculation number CN corresponding to the angle range within which the magnitude of the continuous structure angle θcp calculated at the present time point falls" is set to be "1". Thereby, the "calculation number CN corresponding to the angle range within which the magnitude of the continuous structure angle θcp of the same continuous structure falls" is correctly counted/incremented.

At Step 850 shown in FIG. 8, the CPU 31 determines whether or not there is any angle range whose calculation number CN is larger than the threshold number CN1th in the angle storing information 50 which is updated at Step 845.

When there is no angle range whose calculation number CN is larger than the threshold number CN1th in the angle storing information 50, the CPU 31 makes a "No" determination at Step 850, and proceeds to Step 895 to tentatively terminate the present routine. As a result, when there is no angle range whose calculation number CN is larger than the threshold number CN1th, the collision preventing control is prohibited from being performed. Accordingly, even if the minimum time to collision TTC is equal to or shorter/smaller than the threshold time period T1th, the collision preventing control is not performed.

On the other hand, when there is any angle range whose calculation number CN is larger than the threshold number CN1th in the angle storing information 50, the CPU 31 makes a "Yes" determination at Step 850, and proceeds to Step 855. At Step 855, the CPU 31 determines whether or not the minimum time to collision TTC is equal to or shorter/smaller than the threshold time period T1th.

When the minimum time to collision TTC is equal to or shorter/smaller than the threshold time period T1th, the CPU 31 performs the collision preventing control at Step 860, and proceeds to Step 895 to tentatively terminate the present routine. In contrast, when the minimum time to collision TTC is longer/larger than the threshold time period T1th, the CPU 31 proceeds to Step 895 to tentatively terminate the present routine without performing the collision preventing control.

Meanwhile, when there is continuous point whose continuous structure probability is "0" among the continuous points which are selected at Step 915 shown in FIG. 9A at a time point at which the CPU 31 proceeds to Step 930 shown in FIG. 9A, the CPU 31 makes a "Yes" determination at Step 930, and proceeds to Step 935. At Step 935, the CPU 31 executes an interpolation distance calculating process for calculating an interpolation distance Lc. In actuality, when the CPU 31 proceeds to Step 935, the CPU 31 executes a subroutine represented by a flowchart shown in FIG. 14.

Figures 14, 15:
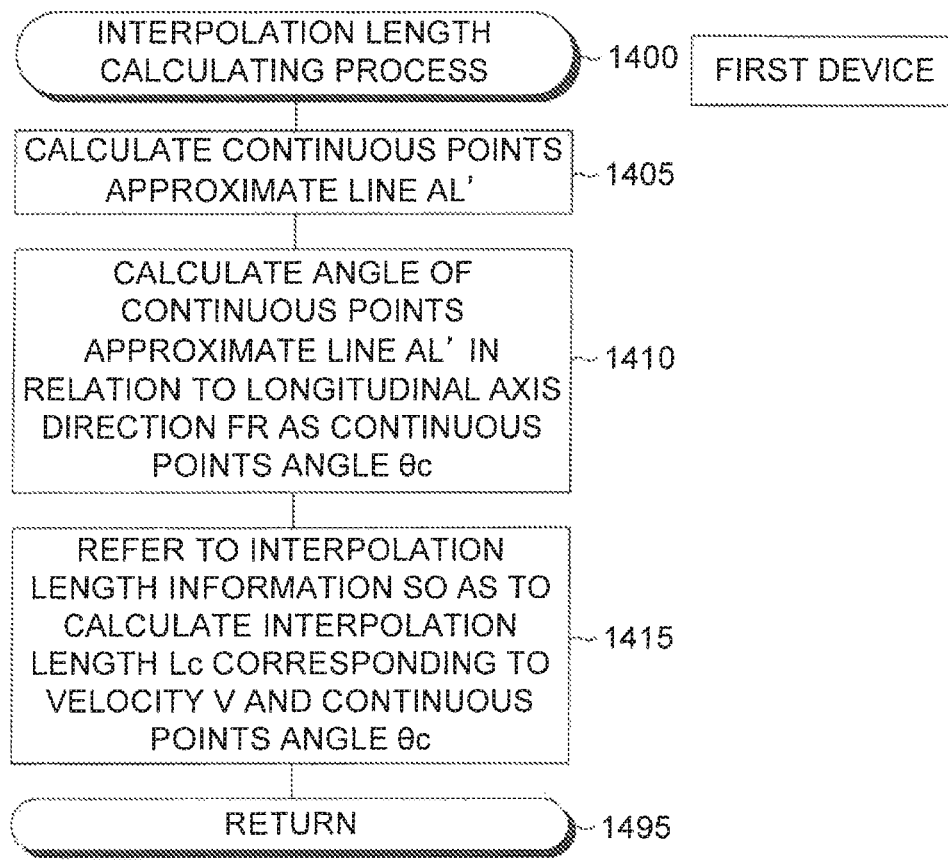
FIG. 14 is a flowchart illustrating a routine which is executed by the CPU of the collision preventing ECU in an interpolation distance calculating process included in the routines illustrated in FIGS. 9A, 9B, 10, and 11.
FIG. 15 is a diagram illustrating interpolation distance information.

Specifically, when the CPU 31 proceeds to Step 935, the CPU 31 starts the process from Step 1400 shown in FIG. 14 to sequentially execute processes of Steps 1405 through 1415 in this order.

Step 1405: The CPU 31 calculates, based on the locations/positions of the continuous points in relation to the own vehicle SV in the forward direction selected at Step 915, a continuous points approximate line AL' of those continuous points, using the least-square method.

Step 1410: The CPU 31 calculates, as a continuous points angle θc, an angle of the continuous points approximate line AL' calculated at Step 1405 in relation to the longitudinal axis direction FR of the own vehicle SV.

Step 1415: The CPU 31 refers to interpolation distance information 60 (referred to FIG. 15) to calculate the interpolation distance Lc corresponding to the velocity of the own vehicle SV and a magnitude of the continuous points angle θc, and proceeds to Step 1495 to tentatively terminate the present routine. Thereafter, the CPU 31 proceeds to Step 940 shown in FIG. 9A.

Here, a detail of the interpolation distance information is described using FIG. 15. The interpolation distance information 60 defines a relationship among the magnitude of the continuous points angle θc, the velocity V of the own vehicle SV, and the interpolation distance Lc. The interpolation distance information 60 is stored in the RAM 32 in a form of a look up table (map). According to the interpolation distance information 60, the interpolation distance Lc is longer, as the velocity V of the own vehicle SV is higher, under a situation where the magnitude of the continuous points angle θc is a constant value (remains the same). According to the interpolation distance information 60, the interpolation distance Lc is shorter as the magnitude of the continuous points angle θc is larger under a situation where the velocity V of the own vehicle SV is a constant value (remains the same). For example, according to the interpolation distance information 60, when the magnitude of the continuous points angle θc is "10 deg" and the velocity V of the own vehicle SV is "40 km/h", the interpolation distance Lc is determined to be "5.0 m". According to the interpolation distance information 60, when the magnitude of the continuous points angle θc is "10 deg" and the velocity V of the own vehicle SV is "80 km/h", the interpolation distance Lc is determined to be "7.0 m".

Figure 16A:
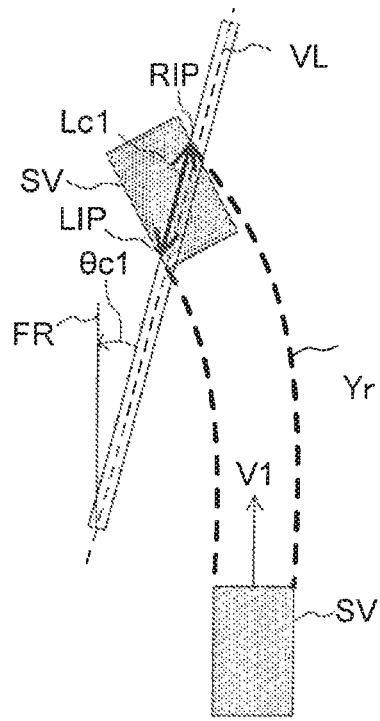
FIG. 16A is a diagram illustrating an interpolation distance when a continuous points angle is small.
Figure 16B:
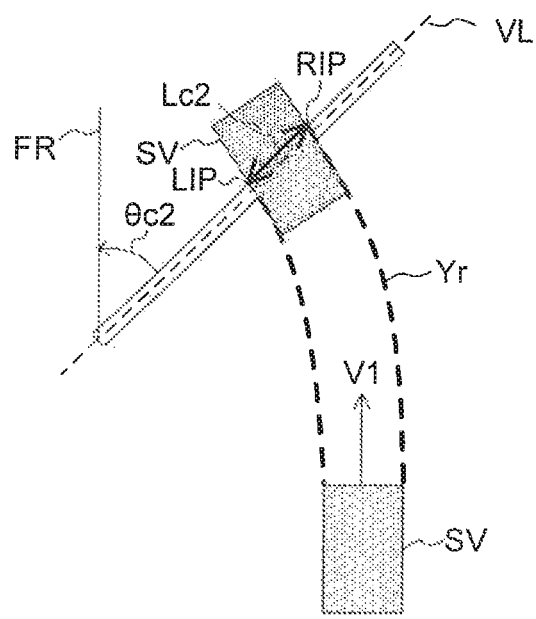
FIG. 16B is a diagram illustrating the interpolation distance when the continuous points angle is big.

Now, the interpolation distance Lc is described using FIGS. 16A and 16B. When it is assumed that the own vehicle SV turns at the velocity V of the own vehicle SV and at a predetermined emergency preventing yaw rate Yr, the interpolation distance Lc is a distance on a virtual line VL which has the continuous points angle θc and is necessary for the own vehicle SV to pass through the virtual line VL. In other words, the interpolation distance Lc is a distance between an "intersection point LIP (referred to FIGS. 16A and 16B)" and an "intersection point RIP (referred to FIGS. 16A and 16B)". The intersection point LIP is a point at which a left side of the own vehicle SV intersects with the virtual line VL having the continuous points angle θc assuming that the own vehicle turns at the velocity V and at the emergency preventing yaw rate Yr. The intersection point RIP is a point at which a right side of the own vehicle SV intersects with the virtual line VL having the continuous points angle θc assuming that the own vehicle turns at the velocity V and at the emergency preventing yaw rate Yr. The locations/positions of the own vehicle SV illustrated in FIGS. 16A and 16B are virtual locations in a case where the own vehicle SV turns at the emergency preventing yaw rate Yr toward the virtual line VL having the continuous points angle θc.

FIG. 16A shows the interpolation distance Lc which is "Lc1" when the velocity V of the own vehicle SV is "V1" and the magnitude of the continuous points angle θc is "θc1". FIG. 16B shows the interpolation distance Lc which is "Lc2" when the velocity V of the own vehicle SV is "V1" and the magnitude of the continuous points angle θc is "θc2". In those examples, the emergency preventing yaw rate Yr is a predetermined fixed value regardless of the continuous points angle θc and the velocity V of the own vehicle SV. The magnitude of the continuous points angle θc2 shown in FIG. 16B is larger than the magnitude of the continuous points angle θc1 shown in FIG. 16A. Therefore, when the velocity V of the own vehicle SV shown in FIG. 16B is the same as the velocity V of the own vehicle SV shown in FIG. 16A, the interpolation distance Lc2 shown in FIG. 16B is shorter than the interpolation distance Lc1 shown in FIG. 16A.

The above interpolation distance Lc is calculated in advance based on the velocity V of the own vehicle SV and the magnitude of the continuous points angle θc. Then, the interpolation distance information 60 stores/holds relationships among the velocity V, the magnitude of the continuous points angle θc, and the calculated interpolation distance Lc, in advance. It should be noted that the threshold distance L1th used at Step 1035 in FIG. 10 and FIG. 11 is set to be equal to or shorter/smaller than the minimum interpolation Lc among the interpolation distances which are included in the interpolation distance information 60.

At Step 940 shown in FIG. 9A, the CPU 31 calculates a distance Ls between confidence points to proceed to Step 945. The distance Ls between confidence points represents a distance between two continuous points each of which continuous structure probability is "1" and which sandwich the continuous point whose continuous structure probability is "0". More specifically, when there is only one continuous point whose continuous structure probability is "0", the CPU 31 calculates, as the distance Ls between the confidence points, a distance between the "continuous point whose continuous structure probability is "1" and which is the closest to the continuous point whose continuous structure probability is "0" in the forward direction" and the "continuous point whose continuous structure probability is "1" and which is the closest to the continuous point whose continuous structure probability is "0" in the opposite direction". When there are a plurality of the continuous points each of which continuous structure probability is "0" and which are adjacent to each other, the CPU 31 calculates, as the distance Ls between the confidence points, a distance between the "continuous point whose continuous structure probability is "1" and which is, in the forward direction, closest to the continuous point which is located at the end in the forward direction among the continuous points each of which continuous structure probability is "0" and which are adjacent to each other" and the "continuous point whose continuous structure probability is "1" and which is, in the opposite direction, closest to the continuous point which is located at the end in the opposite direction among the continuous points each of which continuous structure probability is "0" and which are adjacent to each other".

At Step 945, the CPU 31 determines whether or not the distance Ls between the continuous points calculated at Step 940 is equal to or shorter/smaller than the interpolation distance Lc calculated at Step 935. When the distance Ls between confidence points is equal to or shorter/smaller than the interpolation distance Lc, the own vehicle SV cannot pass through the space where the continuous point whose continuous structure probability is "0" is located. Therefore, in this case, the driver does not steer the own vehicle SV to pass through the space. Accordingly, there is no problem with the CPU 31 recognizing the space as the component of the continuous structure. In view of the above, when the distance Ls between the confidence points is equal to or shorter/smaller than the interpolation distance Lc, the CPU 31 makes a "Yes" determination at Step 945 to proceed to Step 950. At Step 950, the CPU 31 determines that the obstacle including the obstacle point whose time to collision TTC is minimum is the continuous structure to proceed to subsequent processes of Step 960 shown in FIG. 9B.

On the other hand, when the distance Ls between the confidence points is longer/larger than the interpolation distance Lc, the vehicle can pass the space where the continuous point whose continuous structure probability is "0" is located. Therefore, the driver may steer the own vehicle SV to pass the space. If the CPU 31 recognizes the space as the component of the continuous structure, the unnecessary collision preventing control may be performed. Accordingly, when the distance Ls between the confidence points is longer/larger than the interpolation distance Lc, the CPU 31 makes a "No" determination at Step 945. In other words, the CPU 31 determines that the "space where the continuous point whose continuous structure probability is "0" is located" is not the component of the continuous structure. As a result, the total of the distances between the continuous points in the forward direction becomes equal to or smaller than the continuous structure determining distance. Thus, the CPU 31 proceeds to Step 955 to determine that the obstacle including the obstacle point whose time to collision TTC is minimum is not the continuous structure. Subsequently, the CPU 31 proceeds to Step 995 to tentatively terminate the present routine. Thereafter, the CPU 31 proceeds to Step 840 shown in FIG. 8.

Figure 17:
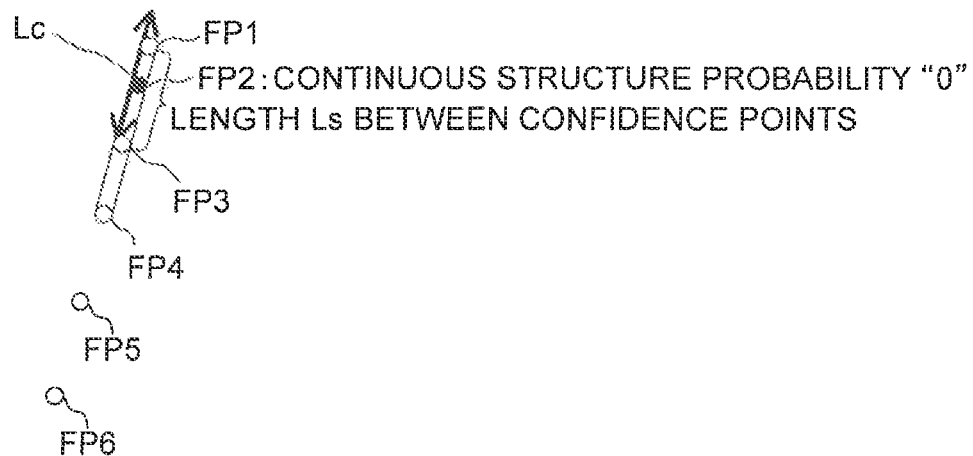
FIG. 17 is a diagram illustrating a process when there is a continuous point whose continuous structure probability is "0".

Next, a concrete example of the interpolation distance calculating process when there is at least one of the continuous point whose continuous structure probability is "0" among the continuous points selected at Step 915 is described using FIG. 17.

In the example illustrated in FIG. 17, similarly to the example illustrated in FIG. 2, the feature points FP1 through FP6 are detected, and the feature point FP4 is the obstacle point whose time to collision TTC is minimum. Through the forward direction selecting process of Step 915 shown in FIG. 9A, the continuous points are selected along the forward direction (the upper right direction on the paper plane of FIG. 2) from the obstacle point FP4. As a result, the feature points FP3 through FP1 are sequentially selected as the continuous points in this order. When the feature point FP1 is selected as the continuous point, the total of the distances between the continuous points becomes larger than the continuous structure determining distance. Thus, the CPU 31 makes a "Yes" determination at Step 920 shown in FIG. 9A to proceed to Step 930.

When it is assumed that the continuous structure probability of the feature point FP2 is "0" in the example shown in FIG. 17, there is the continuous point which is the feature point FP2 whose the continuous structure probability is "0" among the continuous points FP4 through FP1 selected at Step 915 shown in FIG. 9A. Therefore, the CPU 31 makes a "Yes" determination at Step 930 to proceed to Step 935. At Step 935, the CPU 31 calculates the interpolation distance Lc based on the velocity V of the own vehicle SV and the magnitude of the continuous points angle θc of the continuous points FP1 through FP4, and proceeds to Step 940.

At Step 940, the CPU 31 calculates, as the distance Ls between the confidence points, the distance between the continuous point FP3 and the continuous point FP1 whose continuous structure probabilities are "1" and which sandwich the continuous point FP2 whose continuous structure probability is "0". Thereafter, the CPU 31 proceeds to Step 945 to determine whether or not the distance Ls between the confidence points is equal to or shorter/smaller than the interpolation distance Lc.

As illustrated in FIG. 17, the distance Ls between the confidence points is equal to or shorter than the interpolation distance Lc. Thus, the CPU 31 makes a "Yes" determination at Step 945, and proceeds to Step 950 to determine that the obstacle including the obstacle point FP4 whose time to collision TTC is minimum is the continuous structure. Thereafter, the CPU 31 proceeds to subsequent processes of Step 950 shown in FIG. 9B.

In actuality, even though the feature point is the component of the continuous structure, the continuous structure probability of that feature point may be calculated so as to be "0" for some reason. Even if this happens, when the distance Ls between the confidence points corresponding to this feature point is equal to or shorter than the interpolation distance Lc, the CPU 31 recognizes this feature point as the component of the continuous structure point, and determines the obstacle including this feature point as the continuous structure. Accordingly, accuracy in the determination as to whether or not the obstacle is the continuous structure can be improved. It should be noted that, when the feature point whose continuous structure probability is "0" is not the component of the continuous structure, the CPU 31 recognizes this feature point as the component of the continuous structure if the distance Ls between the confidence points corresponding to this feature point is equal to or shorter than the interpolation distance Lc. As described above, if the distance Ls between the confidence points is equal to or shorter than the interpolation distance Lc, the own vehicle SV cannot pass through the space where the continuous point whose continuous structure probability is "0" is located, and thus, the driver does not steer the own vehicle SV to pass through the space. Therefore, there is no problem with the CPU 31 recognizing the space as the component of the continuous structure.

Further, when there is the continuous point whose continuous structure probability is "0" among the continuous points selected at Step 965 shown in FIG. 9B, Step 982 through Step 986 that are similar to the above Step 935 through Step 945, respectively, are executed.

More specifically, when the CPU 31 proceeds to Step 980 shown in FIG. 9B in a case where there is the continuous point whose continuous structure probability is "0" among the continuous points selected at Step 965, the CPU 31 makes a "Yes" determination at Step 980, and proceeds to Step 982. At Step 982, the CPU 31 executes the interpolation distance calculating process to calculate the interpolation distance Lc. In actuality, when the CPU 31 proceeds to Step 982, the CPU 31 executes the subroutine illustrated by the flowchart in FIG. 14.

In the interpolation distance calculating process at Step 982, at Step 1405, the CPU 31 calculates, based on the locations of the continuous points selected at Step 915 in the forward direction in relation to the own vehicle SV and the locations of the continuous points selected at Step 965 in the opposite direction in relation to the own vehicle SV, the continuous points approximate line AL' of those continuous points, using the least-square method. The interpolation distance calculating process at Step 982 differs from the interpolation distance calculating process at Step 935 in the process described just above. The other processes (Step 1410 and Step 1415) in the interpolation distance calculating process at Step 982 are the same as those in the interpolation distance calculating process at Step 935. Thus, descriptions about the other processes are omitted.

The CPU 31 proceeds to Step 984 to calculate the distance Ls between the confidence points after the CPU 31 calculates the interpolation distance Lc at Step 982. A process at Step 984 is the same as the process at Step 940. A description about this process is thus omitted.

Subsequently, the CPU 31 proceeds to Step 986 to determine whether or not the distance Ls between the confidence points calculated at Step 984 is equal to or shorter/smaller than the interpolation distance Lc calculated at Step 982. When the distance Ls between the confidence points is equal to shorter/smaller than the interpolation distance Lc, the CPU 31 makes a "Yes" determination at Step 986, and proceeds to Step 988. At Step 988, the CPU 31 recognizes all of the continuous points selected at Step 965 as the component of the continuous structure, and proceeds to Step 995 to tentatively terminate the present routine. Thereafter, the CPU 31 proceeds to Step 840 shown in FIG. 8.

On the other hand, when the distance Ls between the confidence points is longer/larger than the interpolation distance Lc, the CPU 31 makes a "No" determination at Step 986, and proceeds to Step 990. At Step 990, the CPU 31 recognizes, as the components of the continuous structure, the continuous points from the obstacle point whose time to collision TTC is minimum to the continuous point which is closest to the continuous point whose continuous structure probability is "0" in the forward direction among the continuous point selected in the opposite direction". Next, the CPU 31 proceeds to Step 995 to tentatively terminate the present routine. Thereafter, the CPU 31 proceeds to Step 840 shown in FIG. 8.

In actuality, even though the feature point is the component of the continuous structure, the continuous structure probability of that feature point may be calculated so as to be "0" for some reason. Even if this happens, when the distance Ls between the confidence points corresponding to this feature point is equal to or shorter than the interpolation distance Lc, the CPU 31 recognizes this feature point as the component of the continuous structure point. Thereby, the components of the continuous structure in the opposite direction are accurately selected. Accordingly, accuracy in the determination as to whether or not the obstacle is the continuous structure can be improved.

Meanwhile, when the subtraction value D calculated at Step 1015 or Step 1020 shown in FIG. 10 is equal to or smaller than the threshold D1th, or when the subtraction value D is equal to or larger than the threshold D2th (that is, when the subtraction value D does not fall within the predetermined range), the processing point does not satisfy the above continuous point condition (A). In this case, when the CPU 31 proceeds to Step 1025 shown in FIG. 10, the CPU 31 makes a "No" determination at Step 1025, and proceeds to Step 1055.

At Step 1055, the CPU 31 determines whether or not a selecting number is equal to or larger than a threshold number N1th. The selecting number N represents a number of times of selecting the "processing point which satisfies neither the continuous point condition (A) nor the continuous point condition (B)" with respect to the base point selected at the present time point". When the selecting number N is equal to or larger than the threshold number N1th, the CPU 31 determines that there is no feature point which is qualified to be the continuous point with respect to the base point selected at the present time point. In this case, the CPU 31 makes a "Yes" determination at Step 1055, and proceeds to Step 955 shown in FIG. 9A. At Step 955, the CPU 31 determines that the obstacle including the obstacle point whose time to collision TTC is minimum is not the continuous structure, and proceeds to Step 955 to tentatively terminate the present routine. Thereafter, the CPU 31 proceeds to Step 840 shown in FIG. 8.

In contrast, when the selecting number N is smaller than the threshold number N1th, the CPU 31 makes a "No" determination at Step 1055 shown in FIG. 10, and proceeds to Step 1060. At Step 1060, the CPU 31 selects, as the new processing point, the feature point which is closest to the base point in the side of the forward direction among the feature points except the feature point which has been selected as the processing point, and returns to Step 1010 to determine whether or not the new processing point is the continuous point with respect to the base point which is selected at the present time point.

On the other hand, when the distance L between points calculated at Step 1030 shown in FIG. 10 is larger than threshold distance L1th, the processing point does not satisfy the continuous point condition (B). In this case, when the CPU 31 proceeds to Step 1035, the CPU 31 makes a "No" determination at Step 1035, and proceeds to Step 1040. At Step 1040, the CPU 31 executes the interpolation distance calculating process for calculating the interpolation distance Lc. In actuality, when the CPU 31 proceeds to Step 1040, the CPU 31 executes the subroutine illustrated by the flowchart in FIG. 14.

In the interpolation distance calculating process at Step 1040, at Step 1405, the CPU 31 calculates, based on the locations of the continuous points which have been selected through the forward direction selecting process in relation to the own vehicle SV and the "base point and the processing point which are selected at the present time point" in relation to the own vehicle SV, the continuous points approximate line AL' of those points, using the least-square method. The interpolation distance calculating process at Step 1405 differs from the interpolation distance calculating process at Step 935 in this process described just above. The other processes (Step 1410 and Step 1415) in the interpolation distance calculating process at Step 1040 are the same as those in the interpolation distance calculating process at Step 935. Thus, descriptions about the other processes are omitted.

The CPU 31 proceeds to Step 1045 to determine whether or not the distance L between points is equal to or shorter/smaller than the interpolation distance Lc, after the CPU 31 calculates the interpolation distance Lc at Step 1040. When the distance L between points is equal to or shorter/smaller than the interpolation distance Lc, the own vehicle SV cannot pass through the space between the base point and the processing point which are selected at the present time point. Therefore, the driver does not steer the own vehicle SV to pass through the space between the base point and the processing point. Therefore, there is no problem with the CPU 31 selecting the processing point selected at the present time point as the continuous point. Accordingly, when the distance L between the points is equal to or shorter/smaller than the interpolation distance Lc, the CPU 31 makes a "Yes" determination at Step 1045 to proceed to Step 1050. At Step 1050, the CPU 31 selects the base point and the processing point as the continuous points in the forward direction, and proceeds to Step 1095 to tentatively terminate the present routine. Thereafter, the CPU 31 proceeds to Step 920A shown in FIG. 9A.

In contrast, when the distance L between the points is longer/larger than the interpolation distance Lc, the vehicle can pass through the space between the base point and the processing point which are selected at the present time point. Therefore, the driver may steer the own vehicle SV to pass through the space between the base point and the processing point. Therefore, if the CPU 31 selects the base point and the processing point as the continuous points so as to determine that the base point and the processing point are a part of the continuous structure, the unnecessary collision preventing control may be performed. In view of the above, when the distance L between the points is longer/larger than the interpolation distance Lc, the CPU 31 makes a "No" determination at Step 1045 to proceed to Step 1055.

Figure 18:
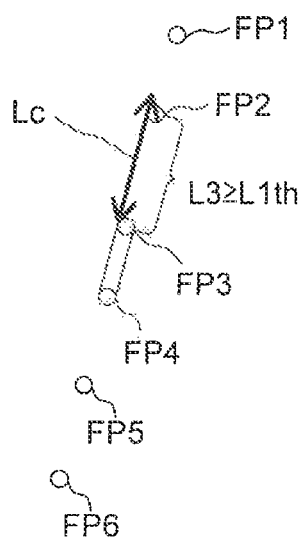
FIG. 18 is a diagram illustrating a process when a distance between a base point and a processing point is less than a threshold distance.

Next, a concrete example of the interpolation distance calculating process when the distance L between the points is shorter/smaller than the threshold distance L1th is described using FIG. 18.

In the example illustrated in FIG. 18, similarly to the example illustrated in FIG. 2, the feature points FP1 through FP6 are detected, the feature point FP4 is the obstacle point whose time to collision TTC is minimum, and the feature point FP4 and the feature point FP3 are selected as the continuous points. Further, when the feature point FP3 is selected as the base point in the forward direction selecting process at Step 915 in FIG. 9A, and the feature point FP2 is selected as the processing point, it is assumed that the distance L3 between the base point FP3 and the processing point FP2 is equal to or longer/larger than the threshold distance L1th.

In this case, when the CPU 31 proceeds to Step 1035 shown in FIG. 10, the CPU 31 makes a "No" determination at Step 1035, and proceeds to Step 1040. At Step 1040, the CPU 31 calculates the "continuous points approximate line AL' among the feature points FP4 and FP3 which have been selected as the continuous points and the processing point FP2 which is selected at the present time point", and calculates the continuous points angle θc which is an angle of the continuous points approximate line AL' in relation to the longitudinal axis direction FR of the own vehicle SV. Thereafter, the CPU 31 calculates the interpolation distance Lc based on the velocity V of the own vehicle SV and the magnitude of the continuous points angle θc, and proceeds to Step 1045.

At Step 1045, the CPU 31 determines whether or not the distance L3 between points is equal to or shorter/smaller than the interpolation distance Lc. As illustrated in FIG. 18, since the distance L3 between points is equal to or shorter/smaller than the interpolation distance Lc, the CPU 31 makes a "Yes" determination at Step 1045, and proceeds to Step 1050 to select the base point FP3 and the processing point FP2 as the continuous points.

As described above, even if the distance L between the base point and the processing point is equal to or longer/larger than the threshold distance L1th, when the distance L between points is equal to or shorter/smaller than the interpolation distance Lc, the CPU 31 selects the base point and the processing point as the continuous points. In general, the feature point of the column unit of the crash barrier tends to be easily detected, and the feature point of the beam unit of the crash barrier tends not to be easily detected. If the feature point is not detected for the beam unit, when the distance L between "two feature points which sandwich the area where the feature point is not detected" is equal to or shorter/smaller than the interpolation distance Lc, the CPU 31 can recognize the area as the component of the continuous structure. Accordingly, accuracy in the determination as to whether or not the obstacle is the continuous structure can be improved.

Meanwhile, when the subtraction value D calculated at Step 1015 or Step 1020 shown in FIG. 11 is equal to or smaller than the threshold D1th or the subtraction value D is equal to or larger than the threshold D2th, in other words, when the subtraction value D does not fall within the predetermined range, the processing point does not satisfy the above continuous point condition (A). In this case, when the CPU 31 proceeds to Step 1025 shown in FIG. 11, the CPU 31 makes a "No" determination at Step 1025, and proceeds to Step 1120.

At Step 1120, similarly to Step 1055 shown in FIG. 10, the CPU 11 determines whether or not the selecting number N representing a number of time of selecting the "processing point which satisfy neither the continuous point condition (A) nor the continuous point condition (B) with respect to the base point selected at the present time point" is equal to or larger than a threshold number N1th. When the selecting number N is equal to or larger than the threshold number N1th, the CPU 31 determines that there is no feature point which is qualified to be the continuous point with respect to the base point selected at the present time point to make a "Yes" determination at Step 1120. Thereafter, the CPU 31 proceeds to Step 980 in FIG. 9B. When the CPU 31 makes a "No" determination at Step 980, the CPU 31 proceeds to Step 988. At step 988, the CPU 31 recognizes all of the continuous points selected through the opposite direction selecting process, as the components of the continuous structure. On the other hand, even if the CPU 31 makes a "Yes" determination and makes a "No" determination at Step 986, the CPU 31 proceeds to Step 990 to recognize, as the components of the continuous structure, the continuous points up to the "continuous point which is located at the end in the opposite direction and whose continuous structure probability is "1"".

On the other hand, when the selecting number N is smaller than the threshold number N1th, the CPU 31 makes a "No" determination at Step 1120 shown in FIG. 11, and proceeds to Step 1125. At Step 1125, the CPU 31 selects, as the new processing point, the feature point which is closest to the base point in the side of the opposite direction among the feature points except the feature point which has been selected as the processing point. Thereafter, the CPU 31 returns to Step 1110 to determine whether or not the new processing point is the continuous point with respect to the base point which is selected at the present time point.

Further, when the distance L between points calculated at Step 1030 shown in FIG. 11 is equal to or larger than the threshold distance L1th, the processing point does not satisfy the above continuous point condition (B). In this case, when the CPU 11 proceeds to Step 1035 in FIG. 11, the CPU 11 makes a "No" determination at Step 1035, and proceeds to Step 1040 in FIG. 11. At Step 1040, the CPU 31 executes the interpolation distance calculating process for calculating the interpolation distance Lc. In actuality, when the CPU 31 proceeds to Step 1040 shown in FIG. 11, the CPU 31 executes the subroutine illustrated by the flowchart shown in FIG. 14.

In the interpolation distance calculating process at Step 1040 shown in FIG. 11, at Step 1405, the CPU 31 calculates, based on the locations of the continuous points which have been selected in relation to the own vehicle SV and the locations of the "base point and the processing point which are selected at the present time point" in relation to the own vehicle SV, the continuous points approximate line AL' of those points, using the least-square method. "The continuous points which have been selected" include the continuous points which have been selected through the forward direction selecting process and the continuous points which have been selected through the opposite direction selecting process. The interpolation distance calculating process of Step 1405 differs from the interpolation distance calculating process of Step 935 in this process. The other processes (Step 1410 and Step 1415) in the interpolation distance calculating process at Step 1040 shown in FIG. 11 are the same as those in the interpolation distance calculating process at Step 935. Thus, descriptions about the other processes are omitted.

The CPU 31 proceeds to Step 1045 shown in FIG. 11 to determine whether or not the distance L between points is equal to or shorter/smaller than the interpolation distance Lc, after the CPU 31 calculates the interpolation distance Lc at Step 1040. When the distance L between points is equal to or shorter/smaller than the interpolation distance Lc, the CPU 31 makes a "Yes" determination at Step 1045 to proceed to Step 1115. At Step 1115, the CPU 31 selects the base point and the processing point as the continuous points in the opposite direction, and proceeds to Step 1195 to tentatively terminate the present routine. Thereafter, the CPU 31 proceeds to Step 970 shown in FIG. 9B.

In contrast, when the distance L between points is longer/larger than the interpolation distance Lc, the CPU 31 makes a "No" determination at Step 1045 shown in FIG. 11, and proceeds to Step 1120.

In this manner, the components of the continuous structure in the opposite direction are selected correctly. Accordingly, accuracy in the determination as to whether or not the obstacle is the continuous structure can be improved.

As understood from the above example, when the obstacle including the obstacle point is the continuous structure, the first device calculates the approximate line AL of the continuous structure based on the continuous points which are the components of the continuous structure, and calculates, as the continuous structure angle θcp, the angle of the continuous structure in relation to the own vehicle SV based on the approximate line AL of the continuous structure. Subsequently, the first device increments the calculation number CN corresponding to the angle range within which the magnitude of the continuous structure angle θcp falls in the angle storing information 50 by "1". The first device determines whether or not there is the angle range whose calculation number CN is larger than the threshold number CN1th. Further, when there is no angle range whose calculation number CN is larger than the threshold number CN1th, the first device prohibits itself from performing the collision preventing control.

Accordingly, when the driver is performing the certain steering operation against the continuous structure, the collision preventing control is not performed, and therefore, the possibility that the driver is annoyed can be reduced.

Second Embodiment

A collision preventing control device (hereinafter, referred to as a "second device") according to a second embodiment of the present invention will next be described. When there is no angle range whose calculation number CN is larger than the threshold number CN1th in the angle storing information 50, the second device sets the "threshold time period Tth used to determine whether or not the collision preventing control should be performed" to a steering threshold time period T2th which is shorter/smaller than a usual threshold time period T1th. The second device differs from the first device only in the above respect. This difference is mainly described below.

Figure 19:
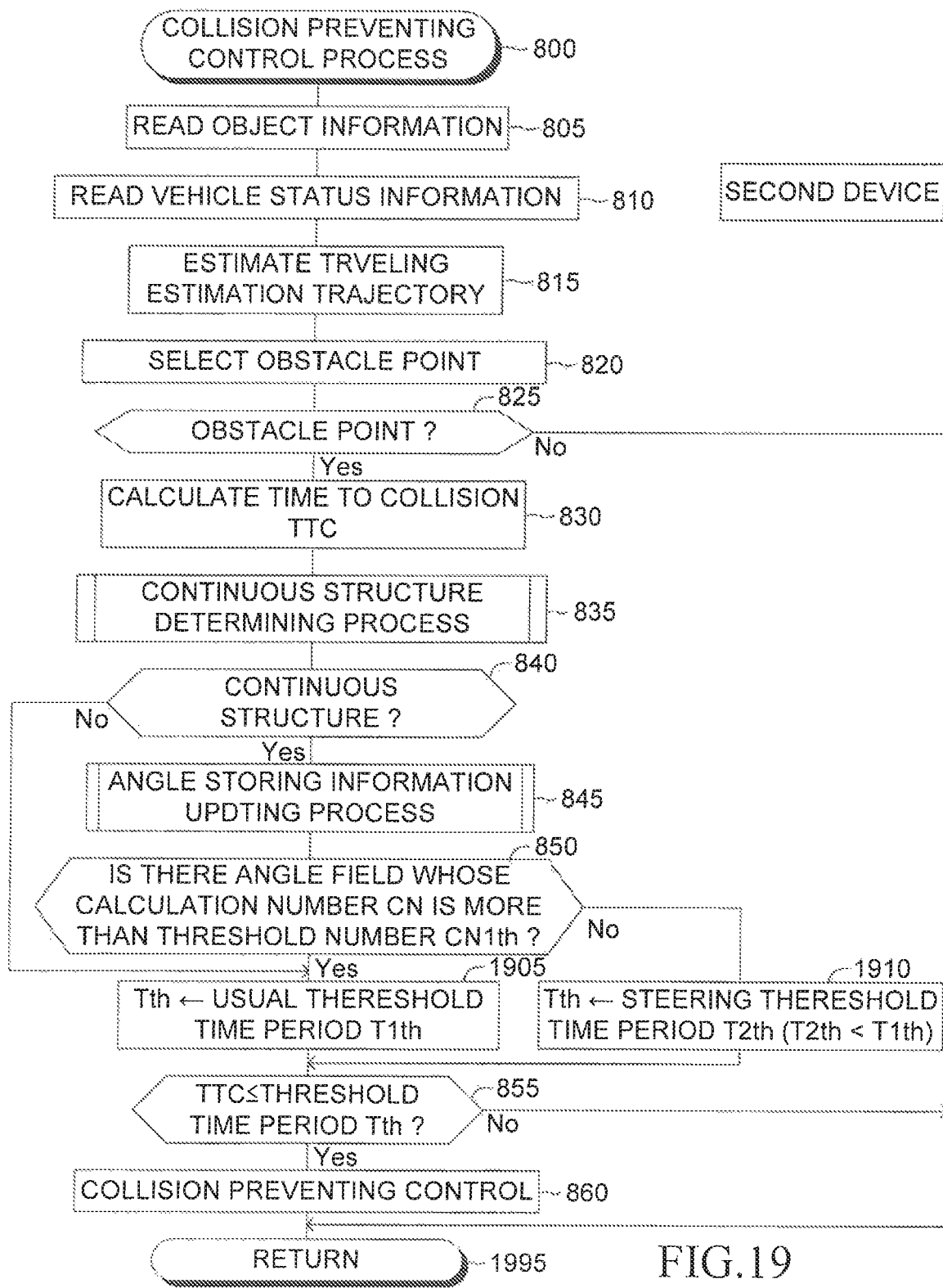
FIG. 19 is a flowchart illustrating a routine which is executed by a CPU of a collision preventing device (second device) according to a second embodiment of the present invention.

The CPU 31 of the second device executes a routine illustrated shown in FIG. 19 in place of the routine illustrated in FIG. 8, every time the predetermined time period elapses. In FIG. 19, the same steps as the steps in FIG. 8 are denoted by common step symbols for the steps in FIG. 8, and description thereof is omitted.

When a predetermined timing has come, the CPU 31 starts the process from Step 1900 of FIG. 19, and sequentially executes the processes of Steps 805 through 810 in this order to select the obstacle point.

When the obstacle point is not selected at Step 820, the CPU 31 makes a "No" determination at Step 825 to tentatively terminate the present routine. On the other hand, when the obstacle point is selected at Step 820, the CPU 31 makes a "Yes" determination at Step 825, and sequentially executes the processes of Steps 830 through 835 in this order. As a result, the determination result as to whether or not the obstacle is the continuous structure is obtained.

When the determination result at Step 835 indicates that the obstacle is not the continuous structure, the CPU 31 makes a "No" determination at Step 840, and proceeds to Step 1905. At Step 1905, the CPU 31 sets the threshold time period Tth to the usual threshold time period T1th, and proceeds to Step 885.

At Step 855, the CPU 31 determines whether or not the minimum time to collision TTC is equal to or shorter/smaller than the threshold time period Tth which is set to the usual threshold time period T1th. When the minimum time to collision TTC is equal to or shorter/smaller than the threshold time period Tth, the CPU 31 makes a "Yes" determination at Step 855, executes the collision preventing control at Step 860, and proceeds to Step 1995 to tentatively terminate the present routine. In contrast, when the minimum time to collision TTC is longer/larger than the threshold time period Tth, the CPU 31 makes a "No" determination at Step 855, and proceeds to Step 1995 to tentatively terminate the present routine.

On the other hand, when the determination result at Step 835 indicates that the obstacle is the continuous structure, the CPU 31 makes a "Yes" determination at Step 840, updates the angle storing information 50 at Step 845, and proceeds to Step 850. When there is the angle range whose calculation number CN is larger than the threshold number CN1th in the angle storing information 50 updated at Step 845, the CPU 31 makes a "Yes" determination at Step 850, and proceeds to Step 1905. At Step 1905, the CPU 31 sets the threshold time period Tth to the usual threshold time period T1th, and proceeds to Step 855. When the minimum time to collision TTC is equal to or shorter/smaller than the threshold time period Tth, the CPU 31 makes a "Yes" determination at Step 855, executes the collision preventing control at Step 860, and proceeds to Step 1995 to tentatively terminate the present routine. In contrast, when the minimum time to collision TTC is longer/larger than the threshold time period Tth, the CPU 31 makes a "No" determination at Step 855, and proceeds to Step 1995 to tentatively terminate the present routine.

On the other hand, when there is no angle range whose calculation number CN is larger than the threshold number CN1th in the angle storing information 50, the CPU 31 makes a "No" determination at Step 850, and proceeds to Step 1910. At Step 1910, the CPU 31 sets the threshold time period Tth to the steering threshold time period T2th, and proceeds to Step 855. The steering threshold time period T2th is set in advance to be shorter/smaller than the usual threshold time period T1th. Thereby, a "possibility that the minimum time to collision TTC is equal to or shorter/smaller than the threshold time period Tth which is set to the steering threshold time period T2th" is lower than a "possibility that the minimum time to collision TTC is equal to or shorter/smaller than the threshold time period Tth which is set to the usual threshold time period T1th". In other words, a specific condition for starting the collision preventing control is more difficult to be satisfied when there is no angle range whose calculation number CN is larger than the threshold number CN1th in the angle storing information 50 than when there is the angle range whose calculation number CN is larger than the threshold number CN1th.

When the minimum time to collision TTC is equal to or shorter/smaller than the threshold time period Tth which is set to the steering threshold time period T2th, the CPU 31 makes a "Yes" determination at Step 855, executes the collision preventing control at Step 860, and proceeds to Step 1995 to tentatively terminate the present routine. In contrast, when the minimum time to collision TTC is longer/larger than the threshold time period Tth, the CPU 31 makes a "No" determination at Step 855, and proceeds to Step 1995 to tentatively terminate the present routine.

As understood from the above example, when there is no angle range whose calculation number CN is larger than the threshold number CN1th, the second device sets the threshold time period Tth to the "steering threshold time period T2th which is shorter/smaller than the usual threshold time period T1th". Accordingly, when the driver is performing the certain steering operation with respect to the continuous structure, the specific condition for starting the collision preventing control is more difficult to be established. Therefore, the possibility that the driver is annoyed can be reduced.

<Modification Example of Second Device>

When there is no angle range whose calculation number CN is larger than the threshold number CN1th in the angle storing information 50, a modification example of the second device changes/corrects the minimum time to collision TTC in such a manner that the minimum time to collision TTC becomes larger, and determines whether or not the changed/corrected time to collision TTC is equal to or shorter/smaller than the "threshold time period Tth which is set to the usual threshold time period T1th". The modification example of the second device differs from the second device only in this respect.

More specifically, when there is no angle range whose calculation number CN is larger than the threshold number CN1th, the CPU 31 makes a "No" determination at Step 850 shown in FIG. 19, and calculates a changed/corrected time to collision TTCg by multiplying the minimum time to collision TTC by a gain which is set to an appropriate value larger than "1". Thereafter, the CPU 31 proceeds to Step 855 shown in FIG. 19. This changed/corrected time to collision TTCg is larger than an origin (pre-corrected) minimum time to collision TTC.

At Step 855, the CPU 31 determines whether or not the changed/corrected time to collision TTCg is equal to or shorter/smaller than the "threshold time period Tth which is set to the usual threshold time period T1th". When the changed/corrected time to collision TTCg is equal to or shorter/smaller than the threshold time period Tth, the CPU 31 executes the collision preventing control. In contrast, when the changed/corrected time to collision TTCg is longer/larger than the threshold time period Tth, the CPU 31 does not execute the collision preventing control.

On the other hand, when there is the angle range whose calculation number CN is large than the threshold number CN1th in the angle storing information 50, the CPU 31 proceeds to Step 855 in FIG. 19 from Step 850 in FIG. 19, and determines whether or not the minimum time to collision TTC is equal to or shorter/smaller than the "threshold time period Tth which is set to the usual threshold time period T1th".

As described above, when there is no angle range whose calculation number CN is larger than the threshold number CN1th in the angle storing information 50, the modification example of the second device changes/corrects the "minimum time to collision TTC used for determining whether or not the collision preventing control is performed" in such a manner that the minimum time to collision TTC becomes larger. Accordingly, when the driver is performing some steering operation with respect to the continuous structure, the specific condition for starting the collision preventing control is more difficult to be satisfied/established. Therefore, the possibility that the driver is annoyed can be reduced.

The present invention is not limited to the above-mentioned embodiments, and various changes are possible within the range not departing from the object of the present invention. Although the first device and the second device execute at least one of the braking preventing control and the steering preventing control at Step 860 shown in FIG. 8 or in FIG. 19, the collision preventing control is limited thereto.

For example, the first device and the second device may perform, as the collision preventing control, displaying control for displaying an alarm screen on an display unit (not shown). The alarm screen guides the driver's line of sight to the direction of the obstacle point whose minimum time to collision TTC is equal to or shorter than the threshold time period Tth. In this manner, the driver's eyes is guided to the direction of the obstacle point, and thus, the driver can start a steering operation to prevent the own vehicle SV from colliding with the obstacle including the obstacle point as soon as possible. The first device and the second device may perform, as the collision preventing control, outputting control for generating an alarm from a speaker (not shown).

The first device and the second device specify the distance between the feature point and the own vehicle SV based on only the object information from the camera sensor 11. The first device and the second device may specify the distance between the feature point and the own vehicle SV based on object information from radar sensors (not shown) in addition to the object information from the camera sensor 11. A front sensor is arranged at a center location on a front bumper of the own vehicle SV in the width direction, one front side sensor is arranged at a right corner on the front bumper of the own vehicle SV, and another front side sensor is arranged at a left corner on the front bumper of the own vehicle SV. These radar sensors are collectively referred to as "radar sensors". Each of the radar sensors radiates a radio wave in a millimeter waveband (hereinafter referred to as "millimeter wave"). When an object is present within a radiation range of the millimeter wave, the object reflects the millimeter wave radiated from the radar sensors. Each of the radar sensors receives the reflected wave, and detects/measures the distance/length between a "point (referred to as "reflection point") which is included in the object and at which the millimeter wave is reflected" and the "own vehicle SV", the direction of the reflection point in relation to the own vehicle SV, and the relative velocity of the reflection point in relation to the own vehicle SV, based on the reflected wave. Then, the radar sensors transmits, to the collision preventing ECU 10, the objection information including a location information and the relative velocity of the reflection point in relation to the own vehicle SV, every time a predetermined time period elapses. The location information includes the distance/length between the reflection point and the own vehicle SV, and the direction of the reflection point in relation to the own vehicle SV.

When the feature point included in the object information from the camera sensor 11 is identified as the reflection point included in the object information from the radar sensors, the first device and the second device use the direction of the feature point included in the object information from the camera sensors 11 as the direction of the feature point in relation to the own vehicle SV. Further, in this case, the first device and the second device use the distance/length between the reflection point which is identified as the feature point and which is included in the object information from the radar sensor and the own vehicle SV, as the distance/length between the feature point and the own vehicle SV. This is because a detection accuracy of the direction by the camera sensor 11 is higher than a detection accuracy of the direction by the radar sensors, and a detection accuracy of the distance/length by the radar sensors is higher than a detection accuracy of the distance/length by the camera sensor 11. Further, the first device and the second device can use the relative velocity of the reflection point identified as the feature point, as the relative velocity of the feature point in relation to the own vehicle SV. The relative velocity of the reflection point is included in the object information from the radar sensor. According to the above method, the first device and the second device can calculate the location and the relative velocity of the feature point accurately.

Further, although it has been described that the continuous structure probability of the feature point is either "0" or "1", the continuous structure probability is not limited to this. For example, the image processing unit of the camera sensor 11 may calculate the continuous structure probability whose value is expressed within a range between "0" and "1", based on a feature amount of the image of a predetermined sized area including the feature point and the continuous structure feature amount.

In this case, at Step 930 shown in FIG. 9A and Step 980 shown in FIG. 9B, the CPU 31 determines whether or not there is a continuous point whose continuous structure probability is equal to or lower/smaller than a threshold probability P1th among the selected continuous points. When there is the continuous point whose continuous structure probability is equal to or lower/smaller than the threshold probability P1th, the CPU 31 makes a "Yes" determination at Step 930 and Step 980. On the other hand, when there is no continuous point whose continuous structure probability is larger than the threshold probability P1th, the CPU 31 makes a "No" determination at Step 930 and Step 980.

What is claimed is:

1. A collision preventing control device comprising:
    an object information obtaining unit for obtaining object information including position information indicative of a position of each of feature points in relation to an own vehicle, the position being specified by a distance between each of the feature points and the own vehicle and a direction of each of the feature points in relation to the own vehicle;
    an obstacle point selecting unit for selecting one of the feature points that has probability of colliding with the own vehicle, as an obstacle point;
    a collision time period calculating unit for calculating a collision time period for which it takes for each of the obstacle points to collide with the own vehicle or for which it takes for each of the obstacle points to most closely approach the own vehicle, based on the relative velocity of each of the obstacle points in relation to the own vehicle and the distance between each of the obstacle points and the own vehicle;
    a collision preventing control unit for determining that a specific condition is established when a minimum collision time period among the calculated collision time periods is equal to or shorter than a threshold time period, and for starting to perform a collision preventing control to prevent the own vehicle from colliding with an obstacle including the obstacle point having the minimum collision time period when it is determined that the specific condition is established;
    a continuous structure determining unit configured to:
        select, as one of pairs of continuous points, one of pairs of the feature points that satisfies a predetermined continuous point condition among the feature points located in a side of a traveling direction of the own vehicle from the obstacle point having the minimum collision time period, based on the object information;
        determine, as a continuous structure, an obstacle including the continuous points as components, when a total of a distance between each of the selected pairs of the continuous points is longer than a first threshold distance; and
        select, as one of pairs of continuous points which are the components included in the continuous structure, one of pairs of the feature points that satisfies the continuous point condition among the feature points located in a side of a direction opposite to the traveling direction of the own vehicle from the obstacle point having the minimum collision time period;
    an angle calculating unit for calculating, based on positions of the continuous points included in the continuous structure in relation to the own vehicle, an approximate line of the continuous structure when the obstacle is determined to be the continuous structure, and for calculating, as a continuous structure angle, an angle of the continuous structure in relation to the own vehicle based on the calculated approximate line;
    an updating unit for updating a calculation number corresponding to an angle range within which a magnitude of the calculated continuous structure angle falls among a plurality of angle ranges, each having a predetermined angle, when the continuous structure angle is calculated; and
    a control unit for prohibiting the collision preventing control unit from performing the collision preventing control when there is no angle range whose calculation number is larger than the threshold number, or for changing the minimum collision time period or the threshold time period such that the specific condition becomes more difficult to be established when there is no angle range whose calculation number is larger than the threshold number than when there is any angle range whose calculation number is larger than the threshold number.

2. The collision preventing control device according to claim 1, wherein the control unit is configured to:
    set the threshold time period to a predetermined first threshold time period when there is any angle range whose calculation number is larger than the threshold number; and
    set the threshold time period to a predetermined second threshold time period that is shorter than the first threshold time period such that the specific condition becomes more difficult to be established, when there is no angle range whose calculation number is larger than the threshold number.

3. The collision preventing control device according to claim 1, wherein the control unit is configured to change, when there is no angle range whose calculation number is larger than the threshold number, the minimum collision time period such that the minimum collision time period becomes larger so that the specific condition becomes more difficult to be established than when there is any angle range whose calculation number is larger than the threshold number.

4. The collision preventing control device according to claim 1, wherein,
the angle calculating unit is configured to calculate the approximate line and the continuous structure angle, every time a predetermined time period elapses, and
the updating unit is configured to initialize each of the calculation number corresponding to each of the angle ranges other than the angle range within which the magnitude of the continuous structure angle calculated at a first time point when the approximate line is newly calculated falls, and to set the calculation number corresponding to the angle range within which the magnitude of the continuous structure angle calculated at the first time point falls to "1", when a direction of the approximate line newly calculated at the first time point in relation to a longitudinal direction of the own vehicle is different from a direction of the approximate line calculated at a second time point which is the predetermined time period before the first time point in relation to the direction of the longitudinal direction of the own vehicle.

5. The collision preventing control device according to claim 1, wherein,
the continuous structure determining unit is configured to:
select the obstacle point having the minimum collision time period as a base point; and
execute a traveling direction selecting process for:
selecting, as a processing point, the feature point which is closest to the base point in the side of the traveling direction of the own vehicle;
determining that a pair of the base point and the processing point satisfies the continuous point condition when a difference between a distance from the base point to the own vehicle and a distance from the processing point to the own vehicle falls within a predetermined range, and a distance from the base point to the processing point is shorter than a second threshold distance; and
selecting the base point and the processing point as the pair of the continuous points when it is determined that the pair of the base point and the processing point satisfies the continuous point condition;
execute, when the total of the distance between each of the pairs of the continuous points is equal to or shorter than the first threshold distance, the traveling direction selecting process again after selecting, as a new base point, the processing point that has been selected as the continuous point;
determine the obstacle as the continuous structure and select the obstacle point having the minimum collision time period as the base point, when the total of the distance between each of the pairs of the continuous points is longer than the first threshold distance; and
execute, after selecting the base point, an opposite direction selecting process for:
selecting, as the processing point, the feature point that is closest to the base point in the side of the direction opposite to the traveling direction of the own vehicle; and
selecting the base point and the processing point as the pair of the continuous points, when a pair of the base point and the processing point satisfies the continuous point condition.

6. The collision preventing control device according to claim 5, wherein,
the continuous structure determining unit is configured to:
in executing the traveling direction selecting process, select, as a new processing point, the feature point which is closest to the base point among the feature points in the side of the traveling direction of the own vehicle except the feature point which has been selected as the processing point, when the pair of the base point and the processing point does not satisfy the continuous point condition, and determine whether or not a pair of the base point and the new processing point satisfies the continuous point condition; and
determine that the obstacle including the obstacle point having the minimum collision time period is not the continuous structure when there is no pair of the base point and the processing point that satisfies the continuous point condition by a time point when the new processing point is selected a predetermined number of times or more.

7. The collision preventing control device according to claim 6, wherein,
the continuous structure determining unit is configured to:
in executing the opposite direction selecting process, select, as a new processing point, the feature point which is closest to the base point among the feature points in the side of the direction opposite to the traveling direction of the own vehicle except the feature point which has been selected as the processing point, when the pair of the base point and the processing point does not satisfy the continuous point condition, and determine whether or not a pair of the base point and the new processing point satisfies the continuous point condition; and
recognize, as the components of the continuous structure, the at least one pair of the continuous points which has been selected when there is no pair of the base point and the processing point that satisfies the continuous point condition by a time point when the new processing point is selected a predetermined number of times or more.

8. The collision preventing control device according to claim 5, wherein,
the continuous structure determining unit is configured to:
in executing at least one of the traveling direction selecting process and the opposite direction selecting process,
calculate a continuous points approximate line through the continuous points which have been selected, the base point and the processing point, based on locations of the continuous points which has been selected in relation to the own vehicle, a location of the base point in relation to the own vehicle, and a location of the processing point in relation to the own vehicle, when the distance from the base point to the processing point is longer than or equal to the second threshold distance;
calculate, as a continuous points angle, an angle of the calculated continuous points approximate line in relation to the own vehicle;
refer to interpolation distance information which defines a relationship among velocity of the own vehicle, the continuous points angle, and an interpolation distance between an intersection point at which a left side of the own vehicle intersects with a virtual line having the continuous points angle and an intersection point at which a right side of the own vehicle intersects with the virtual line under an assumption that the own vehicle is turning at the velocity and at a predetermined emergency preventing yaw rate, so as to calculate the interpolation distance corresponding to a present velocity of the own vehicle and the calculated continuous points angle; and select the base point and the processing point as the pair of the continuous points when the distance from the base point to the processing point is equal to or shorter than the interpolation distance and the difference between the distance from the base point to the own vehicle and the distance from the processing point to the own vehicle falls within the predetermined range.

9. The collision preventing control device according to claim 1,
wherein,
the object information obtaining unit is configured to:
photograph a surround area around the own vehicle using two camera sensors; and
calculate the distance between each of the feature points and the own vehicle and the directions of each of the feature points in relation to the own vehicle, using a parallax between the feature point of the object in one camera image photographed by one camera sensor and that feature point of that object in another camera image photographed by another camera sensor, the object information includes a continuous structure probability that the feature point becomes to be the component of the continuous structure, the continuous structure probability being calculated based on the camera images for a predetermined area including that feature point;

the continuous structure determining unit is configured to:
determine whether or not the continuous points include the feature point whose continuous structure probability is equal to or smaller than a predetermined threshold probability when the total of the distance between each of the pairs of the continuous points is longer than or equal to the first threshold distance;
calculate a continuous points approximate line of the continuous points which have been selected based on locations of the continuous points which have been selected in relation to the own vehicle, when the continuous points include the feature point whose continuous structure probability is equal to or smaller than the threshold probability;

calculate an angle of the calculated continuous points approximate line in relation to the own vehicle, as a continuous points angle;

refer to interpolation distance information which defines a relationship among velocity of the own vehicle, the continuous points angle, and an interpolation distance which is a distance between an intersection point at which a left side of the own vehicle intersects with a virtual line having the continuous points angle and an intersection point at which a right side of the own vehicle intersects with the virtual line under an assumption that the own vehicle is turning at the velocity and at a predetermined emergency preventing yaw rate, so as to calculate the interpolation distance corresponding to a present velocity of the own vehicle and the calculated continuous points angle; and recognize, as the component of the continuous structure, the feature point whose continuous structure probability is equal to or smaller than the threshold probability, when a distance between confidence points is equal to or shorter than the interpolation distance, the distance between confidence points representing a distance between a first continuous point which is closest to the feature point whose the continuous structure probability is equal to or smaller than the threshold probability in the traveling direction of the own vehicle and whose the continuous structure probability is larger than the threshold probability and a second continuous point which is closest to the feature point whose the continuous structure probability is equal to or smaller than the threshold probability in the opposite direction of the own vehicle and whose the continuous structure probability is larger than the threshold probability, so as to determine that the obstacle including the obstacle point having the minimum collision time period is the continuous structure.

10. The collision preventing control device according to claim 1, further comprising;
a vehicle status information obtaining unit for obtaining vehicle status information including a yaw rate and velocity of the own vehicle;
a traveling lane predicting unit for predicting, based on the vehicle status information, a traveling lane of a center point in a width direction of the own vehicle, and
wherein the obstacle point selecting unit is configured to select one of the feature points that has probability of colliding with the own vehicle as the obstacle point, based on a relative traveling direction of the feature points in relation to the own vehicle and the traveling lane.

* * * * *